(12) United States Patent     (10) Patent No.:   US 12,591,498 B2

Ozel et al.     (45) Date of Patent:     Mar. 31, 2026

(54) SYSTEMS AND METHODS OF DEBUGGING DELIVERY OF CONTENT ITEMS

(71) Applicant: Google LLC, Mountain View, CA (US)

(72) Inventors: Ozgur Ozel, Sunnyvale, CA (US); Siddhi Ram Tadpatrikar, Los Altos, CA (US); Cleophus Anderson Davis, IV, Mountain View, CA (US); Jonah Benjamin Wasserman, Mountain View, CA (US); Terrine Balayut Forman, San Francisco, CA (US); Azmat Ali Pasha, Saint Paul, MN (US); Samuel James Stow, Buderim (AU); David Andrew Brown, Huntington Beach, CA (US); Eric Alan Burns, Sunnyvale, CA (US); Eric Daniel Leichtenschlag, Burlingame, CA (US); William Aaron Simmons, Mill Valley, CA (US); Catherine Goings Lin, Irvine, CA (US); Mengke Wang, Sunnyvale, CA (US); Qian Li, Campbell, CA (US); Edward Eric Weng, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 21 days.

(21) Appl. No.: 18/884,676

(22) Filed: Sep. 13, 2024

(65) Prior Publication Data

US 2025/0004902 A1     Jan. 2, 2025

Related U.S. Application Data

(62) Division of application No. 17/515,068, filed on Oct. 29, 2021, now Pat. No. 12,130,719.

(Continued)

(51) Int. Cl.
    *G06F 11/34*     (2006.01)
    *G06F 3/01*     (2006.01)

(52) U.S. Cl.
    CPC .......... *G06F 11/3438* (2013.01); *G06F 3/017* (2013.01); *G06F 11/3476* (2013.01)

(58) Field of Classification Search
    CPC .. G06F 11/34; G06F 11/3438; G06F 11/3476; G06F 3/017
    See application file for complete search history.

(56) References Cited

U.S. PATENT DOCUMENTS 9,542,297 B2   1/2017   Kyte et al.
9,563,544 B2 *   2/2017   Mecke ................ G06F 11/3684
    (Continued)

FOREIGN PATENT DOCUMENTS

CN     106803975     6/2017
CN     102231686     8/2017
    (Continued)

OTHER PUBLICATIONS

Extended European Search Report for Application No. EP23211825.7, mailed May 2, 2024, 45 pages.
    (Continued)

*Primary Examiner* — Kamini B Patel

(74) *Attorney, Agent, or Firm* — DORITY & MANNING P.A.

(57) ABSTRACT

An example method includes receiving, by one or more processing circuits, a registration request comprising an identifier and an activation gesture associated with a mobile application on a mobile device. The example method includes sending, by the one or more processing circuits to the mobile application on the mobile device, a notification indicating the mobile device is registered. The example method includes receiving, by the one or more processing (Continued)

100 circuits, a content item test request for content items in a specific content network. The example method includes testing, by the one or more processing circuits, the content items on the specific content network. The example method includes transmitting, by the one or more processing circuits to the mobile application on the mobile device, content event logs comprising debugging information of the content items during the testing on the content network.

20 Claims, 13 Drawing Sheets

Related U.S. Application Data

(60) Provisional application No. 63/108,025, filed on Oct. 30, 2020.

(56) References Cited

U.S. PATENT DOCUMENTS

| | | | |
|---|---|---|---|
| 9,959,192 B1 | 5/2018 | Burriesci et al. | |
| 10,310,970 B2 | 6/2019 | Seo | |
| 10,521,623 B2 * | 12/2019 | Rodriguez | G06K 7/10297 |
| 10,664,384 B2 | 5/2020 | Paveza et al. | |
| 12,461,740 B2 * | 11/2025 | Barkaee | G06F 8/77 |
| 2006/0179352 A1 | 8/2006 | Lau et al. | |
| 2011/0107308 A1 | 5/2011 | Cooper et al. | |
| 2015/0062046 A1 | 3/2015 | Cho et al. | |
| 2015/0128110 A1 * | 5/2015 | Falk | G06F 11/3636 717/128 |
| 2017/0262130 A1 | 9/2017 | Lloyd et al. | |
| 2017/0277618 A1 * | 9/2017 | Sankruthi | G06F 11/079 |
| 2018/0039501 A1 * | 2/2018 | Jain | H04L 43/045 |
| 2019/0102694 A1 * | 4/2019 | Yates | G06N 3/0499 |
| 2019/0227917 A1 | 7/2019 | Henry et al. | |
| 2019/0377657 A1 * | 12/2019 | McCauley | G06F 11/2294 |
| 2020/0074064 A1 | 3/2020 | Chen | |
| 2020/0097705 A1 | 3/2020 | Khade et al. | |
| 2020/0326819 A1 | 10/2020 | Martin et al. | |
| 2022/0377165 A1 | 11/2022 | Torma | |
| 2023/0367834 A1 * | 11/2023 | Thakur | H04L 43/045 |

FOREIGN PATENT DOCUMENTS

| | | |
|---|---|---|
| CN | 109815106 | 5/2019 |
| JP | 2015/018492 | 2/2014 |

OTHER PUBLICATIONS

International Preliminary Report on Patentability for Application No. PCT/US2021/057192, mailed May 11, 2023, 13 pages.
International Search Report and Written Opinion for Application No. PCT/US2021/057192, mailed Apr. 25, 2022, 20 pages.
Invitation to Pay Additional Fees for Application No. PCT/US2021/057192, mailed Mar. 1, 2022, 3 pages.
Chinese Search Report Corresponding to Application No. 2021800178680 on Jul. 2, 2025.

* cited by examiner

200

202

Present a first application interface

204

Generate debugging information from content event logs

206

Detect a predetermined user action

208

Present the debugging information

400

SYSTEMS AND METHODS OF DEBUGGING DELIVERY OF CONTENT ITEMS

RELATED APPLICATIONS

The present application is a divisional of U.S. patent application Ser. No. 17/515,068 (filed Oct. 29, 2021), which is hereby incorporated by reference herein in its entirety.

U.S. patent application Ser. No. 17/515,068 claims priority to U.S. Provisional Patent Application No. 63/108,025 (filed Oct. 30, 2020), which is hereby incorporated by reference herein in its entirety.

BACKGROUND

In a computer networked environment such as the internet, entities such as people or companies provide content items for display in content item slots to attract consumers. Entities that provide the content items may desire to debug malfunctions of the content items.

SUMMARY

Some implementations relate to a method of debugging delivery of content items. The method implemented by one or more processing circuits. The method includes presenting, by a mobile application executing on a mobile device, a first application interface. Further, the method includes generating debugging information from content event logs, wherein the content event logs are associated with content item slots in which content items are presented in the mobile application. Further, the method includes detecting, by the mobile device, a predetermined user action. Further, the method includes, in response to detecting the predetermined user action presenting, by a debugging interface, the debugging information.

In some implementations, the method further includes remediating, by the debugging interface, a first exception of the debugging information based on modifying a configuration of the content items. In various implementations, the debugging interface is presented as an overlay on the first application interface. In some implementations, the method further includes sending, by the mobile application, a registration request comprising an identifier and an activation gesture and receiving, by the mobile application, a notification indicated the mobile device is registered. In various implementations, the predetermined user action is a gesture, and wherein the gesture is at least one of a shake, a flick, or a user-defined custom gesture configured within the mobile application. In some implementations, content event logs comprise a number of events based on a threshold period of time or threshold number of events, and wherein each event of the number of events comprises usage data of the content items presented in the mobile application. In various implementations, each of the content item slots comprises different debugging information, and wherein the content event logs are organized in the debugging interface based on recency of the different debugging information for each of the content item slots, and wherein inactive content items are organized together. In some implementations, the method further includes updating, by the debugging interface, the content event logs in real-time based on receiving additional debugging information associated with content items. In various implementations, the method further includes expanding, by the debugging information, the debugging information to comprise a detailed description of the debugging information, wherein the detailed description comprises one or more action items. In some implementations, the method further includes requesting, by the debugging information, a content item test for the content items in a specific content network, wherein the content items are associated with a plurality of content networks for displaying the content items. In various implementations, the method further includes transmitting, by the debugging information to a remediation system, the content event logs.

Figure 1:
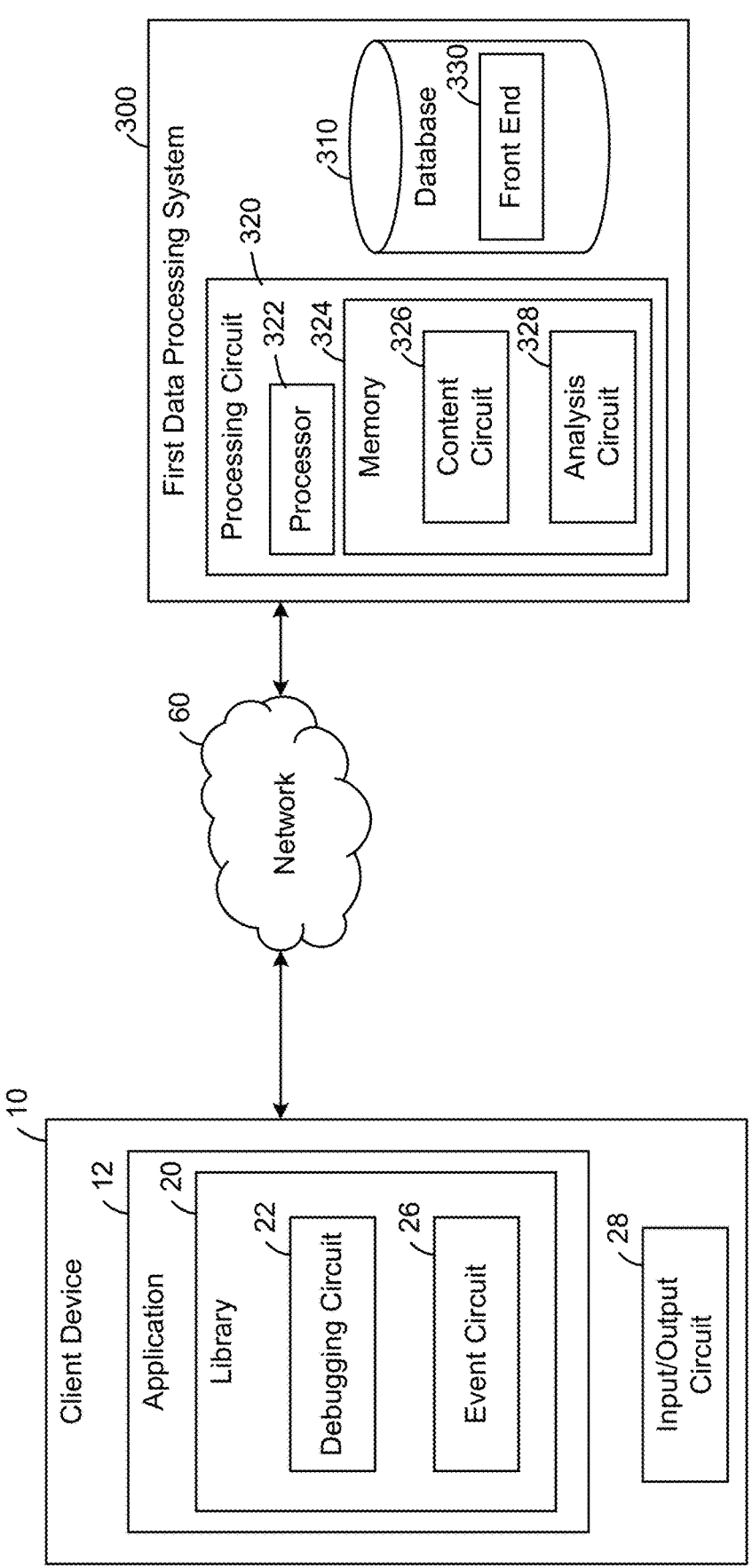
FIG. 1 is a block diagram depicting an implementation of a system for debugging, according to some embodiments.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

In many domains, it may be desirable to debug content items in a debugging interface (e.g., software development kit (SDK)) from a mobile application on a mobile device. For example, in the event a malfunction (e.g., a software crash, a hardware failure, etc.), it is often desirable to view content item event logs such as debugging information (e.g., interaction data and debug data), and the like in order to diagnose and fix the malfunction. Additionally, it may be desirable for a non-application-developer to fix malfunctions and perform tests of content items through the debugging interface without coding.

In many systems, to analyze content item malfunctions and modify content item configurations associated with a mobile application an application developer debugs the code utilizing various testing techniques and amends the code, all utilizing a debugging interface (e.g., Android SDK, iOS SDK, VMware SDK, Nordic SDK, Java Debug Interface (JDI), Chrome DevTools, debugger, etc.). Indeed, since debugging interface introduction, debugging interfaces have become a standard tool for developing mobile application. However, debugging interfaces are technical and require experience in programming and developing code, and cannot be utilized by a non-application-developer to inspect mobile applications (e.g., event logs, test), understand the health of mobile applications (e.g., malfunctions, performance, configuration), or modify configurations of the mobile applications (e.g., content item configurations). Thus, the ability for non-application-developers to utilize a debugging interface to inspect mobile applications, understand the health of mobile applications, and modify configurations of mobile applications, provides non-application-developers the ability to view and perform actions on the debugging interface that typically only application developers can view and perform. This unique debugging interface and computer architecture methodologies provide improved data reporting and analysis pathways and computer architectures. The pathways and architectures may be invoked by non-application-developers to configure and analyze mobile application event logs (e.g., content item event logs) in a robust and timely manner.

Accordingly, systems and methods of the present disclosure relate generally to debugging content items on a debugging interface from a mobile application on a mobile device. More specifically, systems and methods of the present disclosure relate to a unique debugging interface and computer architecture methodologies to present event logs and configure content items from the mobile device. Thus, the systems and methods described herein describes a method to debug content items and modify configurations of content items. In various implementations, the mobile device described herein includes capabilities for performing debugging, performing content network tests, and presenting debugging interfaces.

In situations in which the systems discussed here collects personal information about users and/or entities, or may make use of personal information, the users and/or entities are provided with an opportunity to control whether programs or features collect user information and/or entity information (e.g., information about a user's social network, social actions or activities, profession, a user's preferences, or a user's current location), or to control whether and/or how to receive content from the content server that may be more relevant to the user and/or entity. In addition, or in the alternative, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user and/or entity have control over how information is collected about the user and/or entity and used by a content server.

Referring now to FIG. 1, a block diagram depicting an implementation of a system 100 for debugging, according to some embodiments. System 100 includes client device 10, first data processing system 300. In various implementations, components of system 100 communicate over network 60. Network 60 may include computer networks such as the Internet, local, wide, metro or other area networks, intranets, satellite networks, other computer networks such as voice or data mobile phone communication networks, combinations thereof, or any other type of electronic communications network. Network 60 may include or constitute a display network (e.g., a subset of information resources available on the Internet that are associated with a content placement or search engine results system, or that are eligible to include third party content items as part of a content item placement campaign). In various implementations, network 60 facilitates secure communication between components of system 100. As a non-limiting example, network 60 may implement transport layer security (TLS), secure sockets layer (SSL), hypertext transfer protocol secure (HTTPS), and/or any other secure communication protocol.

Client device 10 (sometimes referred to herein as a "mobile device") may be a mobile computing device, smartphone, tablet, smart watch, smart sensor, or any other device configured to facilitate receiving, displaying, and interacting with content (e.g., web pages, mobile applications, etc.). Client device 10 may include an application 12 to receive and display online content and to receive user interaction with the online content. For example, application 12 may be a web browser. Additionally, or alternatively, application 12 may be a mobile application associated with a specific merchant. Client device 10 may also include an input/output circuit 28 for communicating data over network 60 (e.g., receive and transmit to first data processing system 300).

In various implementations, application 12 interacts with a content publisher to receive online content and/or network content. For example, application 12 may receive an information resource from a content publisher. The information resources may include web-based content items such as a web page or other online documents. The information resources may include instructions (e.g., scripts, executable code, etc.) that when interpreted by application 12 cause application 12 to display a graphical user interface such as an interactable web page and/or an interactive mobile application to a user (e.g., first application interface). In various implementations, application 12 can include one or more application interfaces for presenting an application (e.g., mobile application, web-based application, virtual reality/augmented reality application, smart TV application and so on).

Application 12 is shown to include library 20 having a debugging circuit 22, and an event circuit 26. The library 20 may include a collection of software development tools contained in a package (e.g., software development kit (SDK), application programming interface (API), integrated development environment (IDE), debugger, etc.). For example, library 20 may include an application programming interface (API). In another example, library 20 may include a debugger. In yet another example, the library 20 may be an SDK that includes an API, a debugger, and IDE, and so on. In some implementations, library 20 includes one or more libraries having reusable functions that interface with a particular system software (e.g., iOS, Android, Linux, etc.). Library 20 may facilitate embedding functionality in application 12. For example, a developer may use library 20 to automatically transmit event logs whenever an event of a specific type occurs on application 12. As a further example, library 20 may include a reusable function configured to collect and report device analytics and a user may insert the reusable function into the instructions of application 12 to cause the reusable function to be called during specific actions of application 12 (e.g., during testing). In some implementations, debugging circuit 22, and/or event circuit 26 are functionalities provided by library 20 (e.g., reusable functions, etc.).

Debugging circuit 22 can be configured to provide one or more debugging interfaces. In various implementations, the debugging interface can be invoked and overlayed (e.g., in-app overlay) on an application interface of application 12 presented in the viewport of client device 10. For example, during the execution of application 12, the user may provide an input to the client device (e.g., captured by the input/output circuit 28) that can invoke and overlay the debugging interface on the application interface of application 12. The debugging interface provided by the debugging circuit can include various functionality, such as enabling a non-application-developer to fix malfunctions and perform tests of content items. In various implementations, content items can be presented in content item slots during the execution of application 12 and the event circuit 26 can detect events (sometimes referred to herein as "request") and collect event logs based on interactions with various content items in various content item slots. The debugging circuit 22 can further analyze the collected event logs to generate debugging information.

In some implementations, the debugging circuit 22 can be configured to generate debugging information (sometimes referred to as a "debugging summary") of content items for application 12. The debugging information can be generated based on pre-loaded content items, debugger requests (e.g., user interactions), and/or other collected library interactions. The debugging information could include status information of the content items based on collected event logs by the event circuit 26. For example, content item X may have a status that indicates the content item was served (e.g., "Content Item Served," "Fill," etc.) via content item slot A on content network one. In another example, content item Y may have a status that indicates the content item was not served (e.g., "Content Item Didn't Serve," "No Fill," etc.) via content item slot B on content network two. In yet another example, content item Z may have a status that indicates the content item was not filled (e.g., "No Fill", or "No Activity") via content item slot C on content network three. In each example, the status including the content item slot and content network are based on analyzing the event logs collected by the event circuit 26 and generating debugging information. In various implementations, the debugging information can also include other information, but not limited to, additional malfunction information, reasons for malfunction, remediation options, time stamps, elapsed time to serve/not server, health (e.g., readable summaries about content item health), requests for specific content items, and so on. In some implementations, the debugging information can be sorted by recency or various other parameters set by the user or by any computing device and/or circuits described herein. The debugging information may further be shared with a third-party or other computing devices. For example, the debugging information, after generation, may be sent over network 60 to database 310. In another example, the debugging information, after generation, may be compiled into a report and sent to another computing device (e.g., via email, AirDrop, Bluetooth, messaging) or saved to another storage system.

In an example implementation, the application 12 executed by the client device 10 can cause an application interface to be overlaid with the debugging interface on the client device 10. For example, the user may perform a gesture (e.g., input) on the client device 10 to invoke the debugging interface. In response, the debugging circuit 22 executing the debugging interface may request data, such as from content item event logs stored in database 310 or directly from event circuit 26. For example, upon the request the event circuit 26 may begin collecting content item event logs (sometimes referred to herein as "requests") and transmit them as events (or requests) occur. In another example, upon the request, the first data processing system 300 may perform a database query (e.g., querying database 310) to identify previously collected content item event logs (e.g., within past one hour, between specific time frame, between specific frame, more recent ten, etc.). In some implementation, the event circuit 26 can collect content item event logs in a particular session and bundle them together when the particular session finished. For example, the user may initialize a testing session to test various aspects of the application 12 by performing various interactions (e.g., clicking, scrolling, viewing, navigating, etc.), and during the testing session the event circuit 26 may collect and/or generate various debugging information. In this example, once the session is completed (e.g., after a malfunction, after closing of the application, upon request, etc.) the content item event logs can be bundled together by the event circuit 26 and sent to the debugging circuit 22, stored on the client device 10 (e.g., in cache, in memory, etc.), and/or sent to the first data processing system 300 for analysis and/or storage.

In another example implementation, the application 12 executed by the client device 10 can cause a web browser to the display the debugging interface on the client device 10. For example, the user may connect (e.g., via the network 60) to a website structured to host the debugging interface. In various implementations, hosting the debugging interface can include infrastructure such as, but not limited to, host devices (e.g., computing device) and a collection of files defining the debugging interface and stored on the host devices (e.g., in a database). The web browser operates by receiving input of a uniform resource locator (URL) into a field from an input device (e.g., a pointing device, a keyboard, a touchscreen, mobile phone, or another form of input device). In response, the debugging circuit 22 executing the debugging interface in the web browser may request data such as from content item event logs from database 310. The web browser may include other functionalities, such as navigational controls (e.g., backward and forward buttons, home buttons). In some implementations, the debugging interface can include both a client-side interface and a server-side interface. For example, a client-side interface can be written in one or more general purpose programming languages and can be executed by client device 10. The server-side interface can be written, for example, in one or more general purpose programming languages and can be executed by the first data processing system 300. Additional details associated with the debugging interface are described in detail with reference to example FIGS. 5-7.

Event circuit 26 may detect events within application 12. In various implementations, event circuit 26 may be configured to trigger other functionality based on detecting specific events (e.g., transactions, in-app purchases, achieving a certain level in an in-app game, performing a certain number of actions, spending a certain amount of time interacting with an application, etc.). For example, event circuit 26 may trigger debugging circuit 22 upon detecting an event within application 12. In various implementations, library 20 includes a function that is embedded in application 12 to trigger event circuit 26. For example, a user may include a function of library 20 in a transaction confirmation functionality of application 12 that causes event circuit 26 to detect a confirmed transaction. It should be understood that events may include any action important to a user within an application and are not limited to the examples expressly contemplated herein. In various implementations, event circuit 26 is configured to differentiate between different types of events. For example, event circuit 26 may trigger a first set of actions based on a first type of detected event and may trigger a second set of actions based on a second type of detected event. In various implementations, event circuit 26 is configured to collect event logs associated with the detected event and/or events and transmit the collected event logs to debugging circuit 22.

Event circuit 26 may also bundle (e.g., aggregate, etc.) event logs. In various implementations, event circuit 26 receives event logs associated with one or more detected events in application 12 and/or on client device 10. Event circuit 26 may collect event logs from one or more events and bundle the event logs for transmission (e.g., to debugging circuit 22). For example, event circuit 26 may collect event logs from ten events and combine the event logs into a single bundle. Event logs may include a timestamp of the event, a name of the event, and/or parameters of the event (e.g., a purchased item, a price, a currency, discounts, subscription information, etc.). In some implementations, event circuit 26 transmits bundles to debugging circuit 22. Additionally, or alternatively, event circuit 26 may transmit bundles to input/output circuit 28 and/or debugging circuit 22. In various implementations, event circuit 26 generates a data bundle. The data bundle may include a bundle index, a bundle timestamp, bundle data, and a bundle signature. In various implementations, the bundle signature is generated by event circuit 26. In some implementations, the bundle index specifies where specific event logs are located in the bundle data. For example, the bundle data may include a byte array and the bundle index may include an index to the byte array.

In various implementations, the event circuit 26 can collect events logs based on a designated session. In one example, the designated session may be active from when application 12 is opened/selected to when application 12 is closed/exited. In another example, the designated session may be active based on a user requesting a session to start and a session to end. Each session, the event circuit 26 can collect event logs while the session is active. Once completed, the event logs may be provided to any system described herein. During the session, the event logs may trace each event in the session such that the events are organized in ascending and/or descending order. In some implementations, the events may be organized utilizing various other techniques (e.g., by event type, by timestamp, by malfunctions, etc.).

In various implementations, the event circuit 26 of the client device 10 (e.g., test device) may start collecting event logs when application 12 is opened (e.g., selected by the user via an input/output device 28 of the client device 10), thus starting a session. In some implementations, once the application is closed by the user the event circuit 26 may stop collecting event logs, thus ending the session. In various implementations, the user may force clear event logs or force reset application 12 such that the current session may reset, thus ending a particular session and starting a new session. For example, if a content network test is desired by the user, the user may want to force reset application 12, such that only new event logs are collected associated with the content network test.

The input/output circuit 28 is structured to send and receive communications over network 60 (e.g., with first data processing system 300). The input/output circuit 28 is structured to exchange data (e.g., bundled event logs, content event logs, interactions), communications, instructions, etc. with an input/output component of the first data processing system 300. In one implementation, the input/output circuit 28 includes communication circuitry for facilitating the exchange of data, values, messages, and the like between the input/output circuit 28 and the first data processing system 300. In yet another implementation, the input/output circuit 28 includes machine-readable media for facilitating the exchange of information between the input/output device and the first data processing system 300. In yet another embodiment, the input/output circuit 28 includes any combination of hardware components, communication circuitry, and machine-readable media.

In some embodiments, the input/output circuit 28 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output circuit 28 may provide an interface for the user to interact with various applications (e.g., application 12) stored on the client device 10. For example, the input/output circuit 28 includes a keyboard, a keypad, a mouse, joystick, a touch screen, a microphone, a haptic sensor, a car sensor, an IoT sensor, a biometric sensor, an accelerometer sensor, a virtual reality headset, smart glasses, smart headsets, and the like. As another example, input/output circuit 28, may include, but is not limited to, a television monitor, a computer monitor, a printer, a facsimile, a speaker, and so on. As used herein, virtual reality, augmented reality, and mixed reality may each be used interchangeably yet refer to any kind of extended reality, including virtual reality, augmented reality, and mixed reality.

In some implementations, input/output circuit 28 of the client device 10 can receive user input from a user (e.g., via sensors, or any other input/output devices/ports described herein). A user input can be a plurality of inputs, including by not limited to, a gesture (e.g., a flick of client device 10, a shake of client device 10, a user-defined custom gesture (e.g., utilizing an API), biological data (e.g., stress level, heart rate, hand geometry, facial geometry, psyche, and so on) and/or behavioral data (e.g., haptic feedback, gesture, speech pattern, movement pattern (e.g., hand, food, arm, facial, iris, and so on), or combination thereof, etc. In some embodiments, one or more user inputs can be utilized to perform various actions on client device 10. For example, a user that performs a gesture may invoke a debugging interface associated with library 20 (also as described in detail with references to FIGS. 5-7).

Input/output circuit 28 may transmit bundled event logs to the first data processing system 300. In various implementations, input/output circuit 28 transmits data via network 60. Input/output circuit 28 may confirm the transmission of data. For example, input/output circuit 28 may transmit bundled event logs to the first data processing system 300 and receive a confirmation that the bundled event logs were received successfully. In some implementations, input/output circuit 28 first attempts to transmit bundled event logs to the first data processing system 300 and if that fails then attempts to transmit the bundled event logs to the first data processing system 300 after a predefined period of time has passed (e.g., one minute, five minutes, one hour, etc.). In some implementations, input/output circuit 28 transmits different data to the first data processing system 300 based on various factors (e.g., type of data, amount of data, time, etc.). For example, input/output circuit 28 may transmit encrypted event logs having device identifiers to the first data processing system 300 based the data being personal identifying data (e.g., type of data), and may transmit unencrypted event logs without device identifiers to the first data processing system 300 at a different time based on the amount of data (e.g., one gigabyte, one terabyte, and so on, because large amount of data that is encrypted may require large network bandwidth).

In various implementations, input/output circuit 28 can transmit data periodically. For example, input/output circuit 28 may transmit data at a predefined time. As another example, input/output circuit 28 may transmit data on an interval (e.g., every ten minutes, every ten hours, etc.). Additionally, or alternatively, input/output circuit 28 may transmit data in response to a threshold. For example, input/output circuit 28 may transmit data in response to event circuit 26 receiving a threshold number of event logs from events (e.g., ten events, one-hundred events, etc.). In some implementations, input/output circuit 28 transmits data dynamically. For example, input/output circuit 28 may transmit data in response to client device 10 being connected to a charging source. As a further example, input/output circuit 28 may transmit data in response to the transmission bundle reaching a specified data size (e.g., one megabyte, one gigabyte, etc.).

In some implementations, input/output circuit 28 reports metrics. For example, input/output circuit 28 may transmit metrics alongside each data bundle. The metrics may include a size of the data bundle, a timestamp of the transmission and/or generation of the data bundle, a data bundle index, a debugger identifier, and/or a signature of the data bundle. In various implementations, the debugger identifier includes information associated with library 20. For example, the debugger identifier may include a version number of library 20. The signature of the data bundle may include a hash of the data bundle contents.

First data processing system 300 may receive event logs from library 20 and facilitate performing analysis on received data to generate information. For example, first data processing system 300 may receive a data bundle including event logs from library 20 and securely correlate the received data with data stored in database 310 to generate information. As another example, first data processing system 300 may receive first data associated with a transaction from library 20 and second data associated with metadata of the transaction including a designated content item, and content item slot, and correlate the first and second data.

In various embodiments, first data processing system 300 generates aggregate information. For example, first data processing system 300 may determine how many users completed a transaction after interacting with a content item. The aggregate information may describe a number or grouping of online interactions (e.g., interactions with a number of content items). Additionally, or alternatively, the aggregate information may describe an individual online interaction (e.g., a single interaction with a single content item). Aggregate information may include a unique identifier. In some implementations, the identifier identifies a marketing campaign. Additionally, or alternatively, the identifier may uniquely identify each online interaction and/or application interaction. In some implementations, the aggregate information describes one or more interactions associated with content items. For example, aggregate information may include a time, date, and/or location of online interactions. The interactions described by the anonymous interaction data may include viewing a content item (e.g., navigating to a webpage in which a content item is presented and/or determining that the item or a portion of the item is presented within a viewport of the device upon which the webpage is viewed, etc.), selecting/clicking a content item, hovering over a content item, and/or other interactions with a content item.

First data processing system 300 may be a server, distributed processing cluster, cloud processing system, or any other computing device. First data processing system 300 may include or execute at least one computer program or at least one script. In some implementations, first data processing system 300 includes combinations of software and hardware, such as one or more processors configured to execute one or more scripts.

First data processing system 300 is shown to include database 310 and processing circuit 320. Database 310 may store received data. For example, database 310 may store event logs received from library 20 and/or supplemental data received from first data processing system 300. In some implementations, database 310 stores identifiers. For example, database 310 may store event logs and supplemental data sharing an intermediary identifier. The identifier may be used later for correlation of anonymous interaction data. Database 310 may include one or more storage mediums. The storage mediums may include but are not limited to magnetic storage, optical storage, flash storage, and/or RAM. First data processing system 300 may implement or facilitate various APIs to perform database functions (i.e., managing data stored in database 310). The APIs can be but are not limited to SQL, ODBC, JDBC, NOSQL and/or any other data storage and manipulation API.

In various implementations, database 310 can include a front end 330 that can store mapping information of registered users, user input (e.g., gestures), and client devices. For example, during registration, the analysis circuit 328 may query the front end 330 to store the new registration information. In some implementations, the front end 330 may include key-value pairs of registered client devices to registered user input (e.g., particular gestures).

Processing circuit 320 includes processor 322 and memory 324. Memory 324 may have instructions stored thereon that, when executed by processor 322, cause processing circuit 320 to perform the various operations described herein. The operations described herein may be implemented using software, hardware, or a combination thereof. Processor 322 may include a microprocessor, ASIC, FPGA, etc., or combinations thereof. In many implementations, processor 322 may be a multi-core processor or an array of processors. Memory 324 may include, but is not limited to, electronic, optical, magnetic, or any other storage devices capable of providing processor 322 with program instructions. Memory 324 may include a floppy disk, CD-ROM, DVD, magnetic disk, memory chip, ROM, RAM, EEPROM, EPROM, flash memory, optical media, or any other suitable memory from which processor 322 can read instructions. The instructions may include code from any suitable computer programming language such as, but not limited to, C, C++, C#, Java, JavaScript, Perl, HTML, XML, Python and Visual Basic.

Memory 324 may include analysis circuit 328. In broad view, the analysis circuit 328 may receive data and produce information regarding the data. In some implementations, the analysis circuit 328 can receive a registration request and register user accounts (e.g., accounts) with one or more debuggers (e.g., included in library 20) and/or software development kits. For example, a user of library 20 may register their user account with a client device such that the client device can execute the library 20 and perform various debugging actions. Registering a client device can include, but not limited to, providing various identifying information (e.g., device name, geolocation, identifier, etc.), platform designations (e.g., IOS, Android, WebOS, BlackBerry OS, etc.), user actions (e.g., activation gesture, haptic, biometric, etc.), authentication information (e.g., username, password, two-step criteria, security questions, address information, etc.). Once the analysis circuit 328 approves a registration request, the information associated with the request may be stored in database 310. Additionally, a notification may be transmitted to the client device indicating the client device is registered and can utilize one or more debuggers associated with one or more applications. In some implementations, a client device may include multiple applications (e.g., application 12) and the analysis system 328 may require the user of the client device to register with their user account separately with each application and/or register collectively with all applications. In some implementations, if a client device is not registered with one or more debuggers, the client device (or account associated with the client device) may become suspended if library 20 is executed. A suspended client device may be unable to perform any tests and analysis in library 20.

In various implementations, analysis circuit 328 performs statistical operations on received data to produce statistical measurements describing the received data. For example, analysis circuit 328 may determine an interaction rate associated with a marketing campaign. In some implementations, analysis circuit 328 generates demographic information (e.g., user distributions, etc.), geographic results (e.g., location distributions, etc.), and/or audiences (e.g., a target group of users based on one or more parameters, for example users who purchased more than a threshold amount, etc.). In some implementations, analysis circuit 328 correlates event logs with supplemental data. For example, analysis circuit 328 may correlate event logs associated with an event with supplemental data associated with a content interaction using an intermediate identifier to determine an effect of the content interaction on causing the event. In various implementations, analysis circuit 328 generates information. The information may include an interaction rate, data describing an operation of application 12, and/or the like.

In addition, the statistical operations performed by the analysis circuit 328 can produce usage metrics of client devices (e.g., client device 10) and library 20. Some usage metrics can include, but are not limited to, device registration metrics (e.g., test device registration-how many accounts register at least one client device, number of test devices registered-on average how many test devices does each account register), initialization method metrics (e.g., initialization method-what is the breakdown of methods used to initialize the inspector), debugger metrics (e.g., debugger overall use-how many times has the debugger been initialized, debugger penetration-what percentage of applications have used the debugger at least once, debugger repeat use-how often is the debugger used after it used the first time), content item status metrics (e.g., filled content drill down-what percentage of users drill down into content items that show a "fill" on the content item screen, no fill content item drill down-what percentage of users drill down into content items that show a "no fill" on the content item screen, content item activity-what percentage of content items in a given application have at least one debugger request), content item event log metrics (e.g., error expansion-what percent of errors are expanded), feedback metrics (e.g., feedback usage-what percentage of users submitted feedback), content network testing metrics (e.g., single content network usage-what percentage of users turn on the single content item test, network usage-how many different networks do single content network users use on average, network usage extent-what percent of networks did users perform a single content network test on). The statistical operations performed by the analysis circuit 328 can also produce impact metrics of client devices (e.g., client device 10) and library 20. Some impact metrics can include, but are not limited to, new publisher onboarding metrics (e.g., what percentage of debugger users vs non debugger users get their interactions served (new publisher)), new application onboarding funnel metrics (e.g., what percentage of debugger users vs non debugger users get their interactions served (new application)), error resolution metrics (e.g., what percentage of errors shown in debugger are subsequently resolved), product sales lead (PSL) metrics (e.g., what percentage did cases or bugs change for PSL), and developer relations (DevRel)/advertiser technical solutions (ATS) metrics (e.g., how many times did DevRel/ATS propose debugger solutions to publishers).

In various implementations, the usage metrics and impacts metrics can be calculated based on performing various statistical operations and analysis. The usage metrics and impacts metrics can further be prioritized based on various factors (e.g., publisher segment, publisher region, app platform, language preference, new or existing publisher, and so on). In some implementations, received data and previously collected data stored in database 310 (e.g., event logs, content items, debugging information) can be used to train a machine-learning model. That is, predictions regarding usage and impact could be based on artificial intelligence or a machine-learning model. For example, a first machine-learning model may be trained to identify particular impacts of the library 20 and output a prediction. In this example, a second machine-learning model may be trained to identify usage based on previous usages of library 20. In various implementations, machine learning algorithms can include, but are not limited to, a neural network, convolutional neural network, recurrent neural network, linear regression model, and sparse vector machine). The various computing systems/devices described herein can input various data (e.g., event logs, debugging information and so on) into the machine learning model, and receive an output from the model indicating a particular action to perform.

In some implementations, analysis circuit 328 can be configured to perform content source testing on one or more content networks. Content source testing on one or more content networks can include performing various test plans on application 12 utilizing one or more content items associated with content item slots. During the source testing, various malfunctions and exceptions can be identified. Additionally, the content network can be identified such that the testing occurs on a designated content network (e.g., or multiple designated content networks). In general, content networks connect content items to applications and websites that host the content items. That is, the content networks can receive content from content providers, and the content network can subsequently serve (or provide) content (e.g., content items) to one or more applications (e.g., application 12) and/or websites, such that a user can interact with the content (e.g., purchase an item of the content provider, enroll in a service of the content provider, perform any action based on the provided content). In some implementations, application 12 (or library 20) may communicate directly with content networks (e.g., third-parties) hosted on one or more computing devices (e.g., computer system 800 in FIG. 8). An online advertising network or ad network is a company that connects advertisers to websites that want to host advertisements. The key function of an ad network is an aggregation of ad supply from publishers and matching it with advertiser's demand. In various implementations, library 20 may communicate directly with a content network to obtain configuration (e.g., delivery information for content items, content item slot information, etc.).

In various implementations, the debugging circuit 22 can also perform content source testing on one or more content networks (also as described in detail with references to FIGS. 5-7). In some implementations, the debugging circuit 22 and analysis circuit 328 may work in parallel performing various content source testing and may share resources to improve network latency, bandwidth, and/or storage capabilities.

Figure 2:
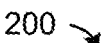
FIG. 2 is a flowchart for a computer-implemented method of debugging delivery of content items, according to some embodiments.
Figure 2:
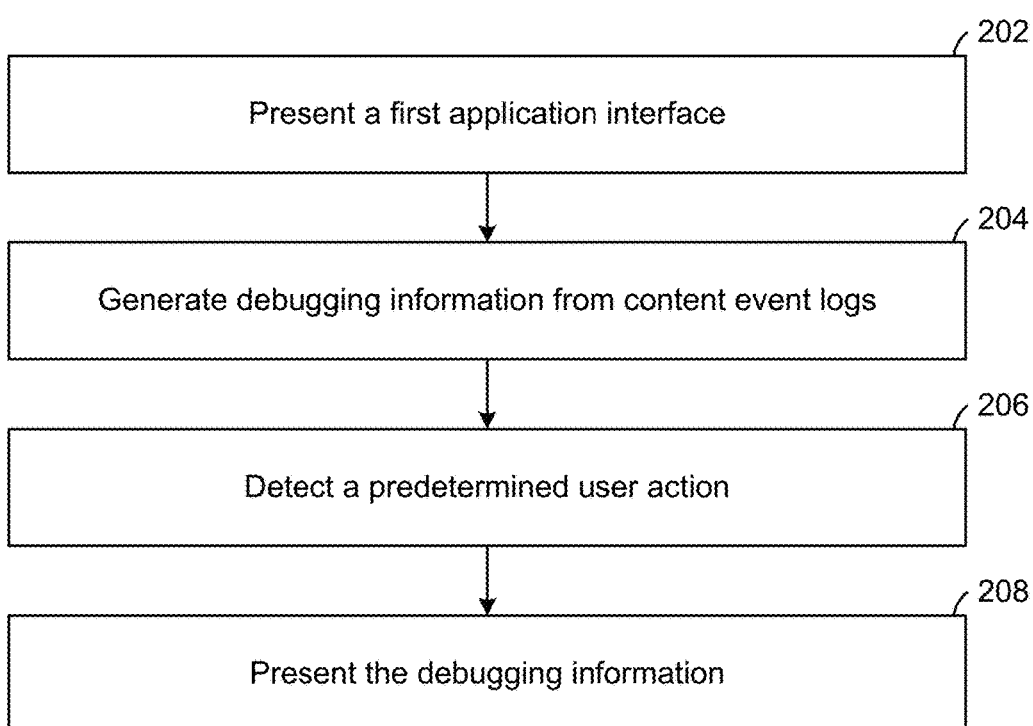

Referring now to FIG. 2, a flowchart for a method 200 of debugging content items, according to some embodiments. The system 100 can be configured to perform method 200. Furthermore, any computing device described herein can be configured to perform method 200.

Figure 8:
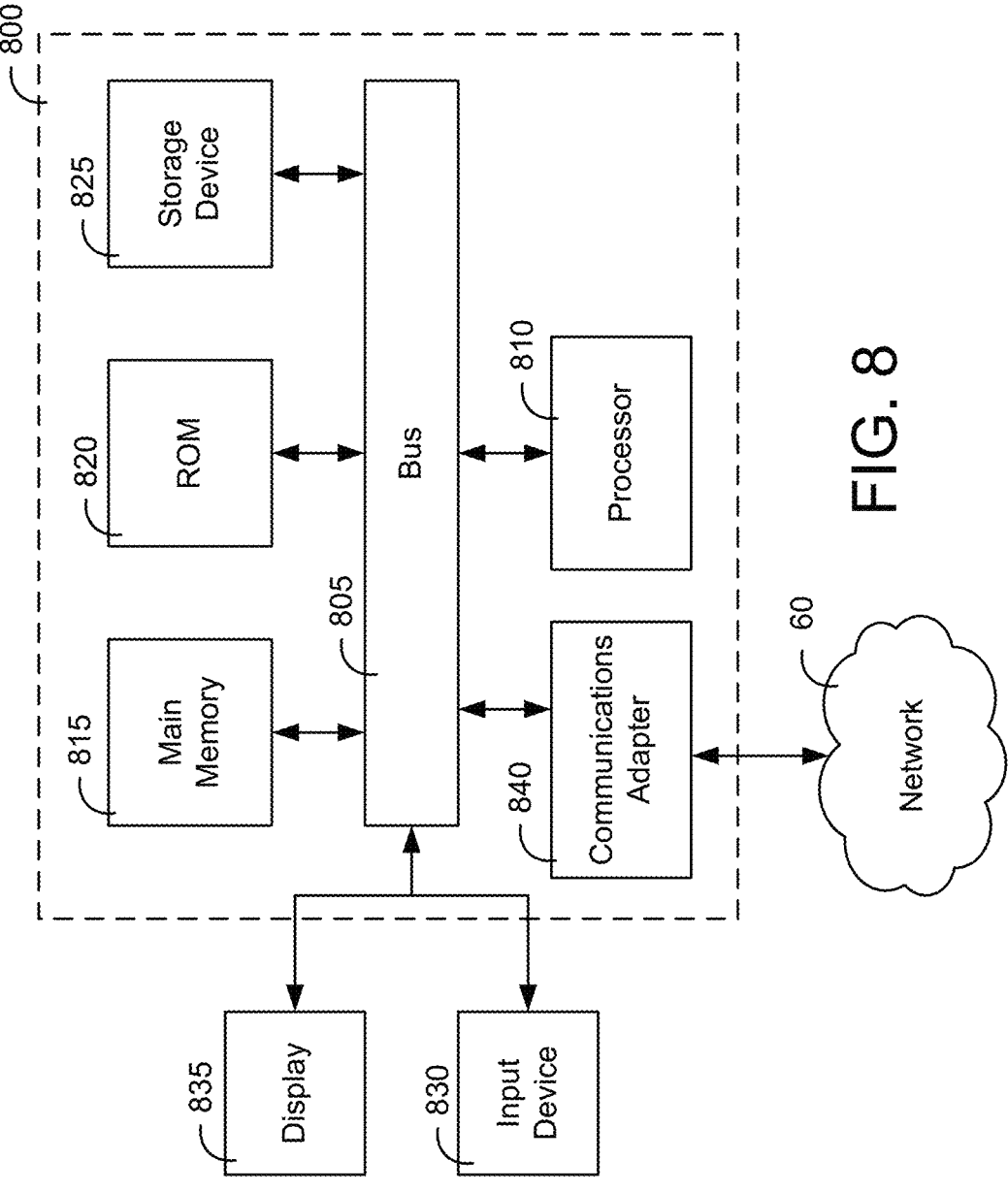
FIG. 8 is a block diagram illustrating an example computing system suitable for use in the various arrangements described herein.

In broad overview of method 200, at block 202, one or more processing circuits (e.g., client device 10, first data processing system 300, and/or computer system 800 in FIG. 8, etc.) can present a first application interface. At block 204, one or more processing circuits can generate debugging information from content event logs. At block 206, the one or more processing circuits can detect a predetermined user action. At block 208, the one or more processing circuits can present the debugging information. Additional, fewer, or different operations may be performed in the method depending on the particular arrangement. In some arrangements, some or all operations of method 200 may be performed by one or more processors executing on one or more computing devices, systems, or servers. In various arrangements, each operation may be re-ordered, added, removed, or repeated. Combinations and variations of the operations of methods described herein are also included within the scope of the present disclosure (e.g., one or more blocks of method 350 can be incorporated into method 200).

In general, method 200 depicts a method of debugging delivery of content items. That is, a debugging interface that can be provided to non-technical personas (e.g., non-application-developers) to fix malfunctions and perform tests of content items through the debugging interface without coding. This can enable non-technical personas to test content item implementations (on physical or virtual devices) without the need for deep technical knowledge. For any issues (sometimes referred to herein as a "malfunction") found, detailed information can be passed along to a user that is more technical for further investigation. The debugging interface is an in-app overlay (facilitated by library 20 (e.g., SDK)) that can be invoked using a physical gesture, API call, another action, or a combination of each. The debugger interface allows users to be able to move from high level views of their applications content items health (e.g., application 12) through to detailed technical responses around specific remediation calls made to various content networks.

Referring to method 200 in more detail, at block 202, the mobile application executing on a mobile device can present a first application interface. In various implementations, the first application interface can be mobile application interface that presents based on a user selecting the mobile application on a display of the mobile device. The first application interface may require an account sign in to identify the user. In some implementations, the first application interface may present the "home screen" of a given application. Additionally, a user of the mobile device may have a plurality of mobile application that can display additional application interfaces.

At block 204, the mobile device can generate debugging information from content event logs, wherein the content event logs are associated with content item slots in which content items are presented in the mobile application. After the application executing on the mobile device detects the predetermined user action, the library 20 can automatically generate (also collect) debugging information associated with content event logs. For example, upon launching application 12, a session may begin, and the library can automatically generate debugging information.

In some implementations, each content item slot can include various data, but not limited to, the content item served (sometimes referred to herein as "delivered") in the content item slot, the content item identification (or name, unique ID, etc.), a content item slot type (e.g., banner, interstitial, rewarded, etc.), and one or more debugger requests including the content network that filled the content item (e.g., content network), the content fill status (e.g., content served, content did not serve, etc.), and a timestamp of the last event (e.g., two second ago, two minutes ago, two hours ago, etc.). In one example, the content fill status can be identified in the content event logs by a "no activity" status (e.g., no debugger requests have been made for the content item slot during a session), a "fill" status (e.g., the debugger request that finished most recently for the content item slot resulted in a "fill"), and a "no fill" status (e.g., the debugger request that finished most recently for the content item slot resulted in a "no fill").

In various implementations, each content item slots can include content event logs specific to that content items slots. The content event logs (also sometimes referred to herein as "bundled event logs") can be based on data collected by the event circuit 26 from one or more events occurring on application 12. The debugging circuit 22 may receive the content event logs from the event circuit 26 and/or the first data processing system (e.g., in particular database 310) and the debugging circuit 22 can analyze each content event log and may utilize additional information to generate debugging information. For example, when the user is navigating through application 12 via the first application interface, the user may click (e.g., performs a request) on content items in content item slots. In this example, each time a user clicks a content item, a content event log may be generated by the event circuit 26. The content event log may include the various data of the content item slots when they are interacted with by the user. In some implementations, a user may execute a session that includes performing a plurality of actions (e.g., clicking, viewing, scrolling, etc.) such that a content event log can have a string of events (e.g., string of debugger requests) associated with the session. In one example, the string of events may be ordered descending by the debugger request that finished most recently. In an alternative example, the string of events may be ordered ascending by the debugger request that finished most recently. In some implementations, the string of debugger request can include each attempted request made to one or more content networks. Additional details regarding the session and string of events are described in detail with reference to FIGS. 1 and 5.

At block 206, the mobile device can detect a predetermined user action. The predetermined user action can be any action the user could provide via the mobile device. The mobile device can detect the predetermined user action based on various sensors located on or in the mobile device (e.g., via an input/out circuit 28 described in detail with reference to FIG. 1). The predetermined user action can be set by the user during registration of the mobile device and/or modified after registration. In particular, the predetermined user action can be, but is not limited to, a gesture (e.g., a flick of client device 10, a shake of client device 10, a user-defined custom gesture (e.g., utilizing an API)), biological data (e.g., stress level, heart rate, hand geometry, facial geometry, psyche, and so on) and/or behavioral data (e.g., haptic feedback, gesture, speech pattern, movement pattern (e.g., hand, food, arm, facial, iris, and so on), or combination thereof, etc.

The debugging interface initialization can be initiated on the mobile device utilizing various methods. In some implementations, as shown above, the user can provide a predetermined user action (e.g., physical gesture, custom application programming interface (API) call, etc.) that can trigger presenting the debugging interface on the mobile device. Regardless of method, the device may be required to be registered as a debugging device to invoke the debugging interface. For example, where the user is leveraging the Custom API as a way to invoke the debugging interface, if the device is not registered, no activity will occur on the front end, however the publisher will get an error callback in code. In various implementations, the Custom API can be utilized to invoke the debugger, so a codeless gesture and/or action may not be required in order for a user to trigger the debugger.

In some implementations, in order for a mobile device to be eligible to leverage the debugging interface, the user may have to register the mobile device (e.g., client device 10) as a debugging device with the first data processing system 300. In addition to enabling the debugging tool, the first device processing system 300 can also mark (e.g., in a table in database 310) that device as a "debugging device" so that developers can debug content items without risk of their account becoming suspended. During registration, the mobile device may prompt the user to provide one or more of, but is not limited to, a device name, a platform, a code (e.g., QR code, pseudo-random code, etc.) a content item identification, a user/publisher identifier, and a predetermined user action etc. The first data processing system 300 can receive the user input based on the prompt and register the device with the provided input. In some implementations, the first data processing system 300 may cross-reference available user information (e.g., from database 310) to verify the provided information before the user device is registered. In various implementations, a registration may not be required to utilize the library 20 and/or the debugging interface. Additionally, the user may register a plurality of devices to utilize the debugging tool (e.g., library 20). For example, a user may register a mobile device for use "on the go" (e.g., no sitting down) but may also register a tablet for use "at home" or "not on the go" (e.g., sitting down).

At block 208, in response to detecting the predetermined user action, the debugging interface can present the debugging information. The debugging interface can present various data (e.g., or sub-interfaces) indicating various activities. For example, the debugging interface may present a summary screen that lists all content item slots associated with one or more content items. The summary screen may be order by activity recency (descending by most recently completed debugger request for the content item slots). In other words, the content items slots with the most recent event (i.e., completed debugger request) will be listed at the top followed by the content item slots with the next most recent event, and so forth. In some implementations, for content item slots that do not have any events for the current session (No Activity), they will appear at the bottom of the list organized in alphabetical order based on their content item slot name. In various implementations, while the debugging interface is presented, it can be dynamically updated to include new event information based on one or more new completed debugger requests (e.g., a banner refresh, or end of game loop). That is, in the case where there is a more recent event, the ordering of the content item slots will be rearranged in real time (e.g., since the debugging interface is fluid/dynamic). In one example, after launch, if the library 20 determines the client device 10 is experiencing difficulties presenting or updating the debugger interface (e.g., based on low bandwidth, power saver mode, slow networking speed, processor/s overutilized, overheating, etc.) the library 20 may update the debugging interface to only present the five most recent events and only refresh when the user takes an action or explicitly refreshes. Additional details regarding the debugging interface are described in detail with reference to FIGS. 5-7.

Figure 3:
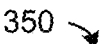
FIG. 3 is a flowchart for a computer-implemented method of debugging delivery of content items, according to some embodiments.
Figure 3:
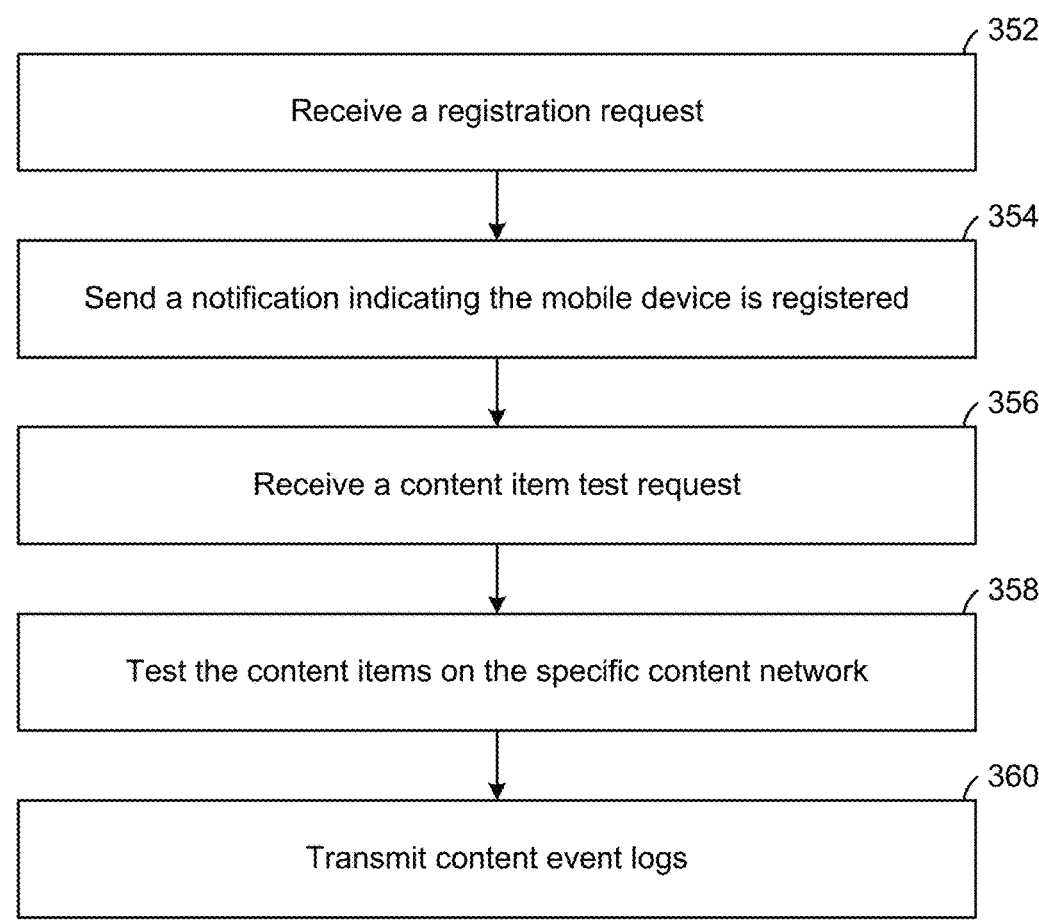

Referring now to FIG. 3, a flowchart for a method 350 of debugging content items, according to some embodiments. The system 100 can be configured to perform method 200. Furthermore, any computing device described herein can be configured to perform method 350.

In broad overview of method 350, at block 352, one or more processing circuits (e.g., client device 10, first data processing system 300, and/or computer system 800 in FIG. 8, etc.) can receive a registration request. At block 354, one or more processing circuits can send a notification indicating the mobile device is registered. At block 356, the one or more processing circuits can receive a content item test request. At block 358, the one or more processing circuits can test the content items on the specific content network. At block 360, the one or more processing circuits can transmit content event logs. Additional, fewer, or different operations may be performed in the method depending on the particular arrangement. In some arrangements, some or all operations of method 350 may be performed by one or more processors executing on one or more computing devices, systems, or servers. In various arrangements, each operation may be re-ordered, added, removed, or repeated. Combinations and variations of the operations of methods described herein are also included within the scope of the present disclosure (e.g., one or more blocks of method 200 can be incorporated into method 350).

Referring to method 350 in more detail, at block 352, the one or more processing circuits can receive a registration request including an identifier and an activation gesture associated with a mobile application on a mobile device At block 354, the one or more processing circuits can send, to the mobile application on the mobile device, a notification indicating the mobile device is registered. In various implementations, the registration request information (e.g., identifier, activation gesture) can be stored in front end 330 of database 310.

At block 356, the one or more processing circuits can receive a content item test request for content items in a specific content network.

At block 358, the one or more processing circuits can test the content items on the specific content network. In various implementations, the mobile device may perform the test of the content items on the specific content networks. In some implementations, the client device and one or more processing circuits may work collectively to a test.

At block 360, the one or more processing circuits can transmit, to the mobile application on the mobile device, content event logs comprising debugging information of the content items during the testing on the content network.

Figure 4:
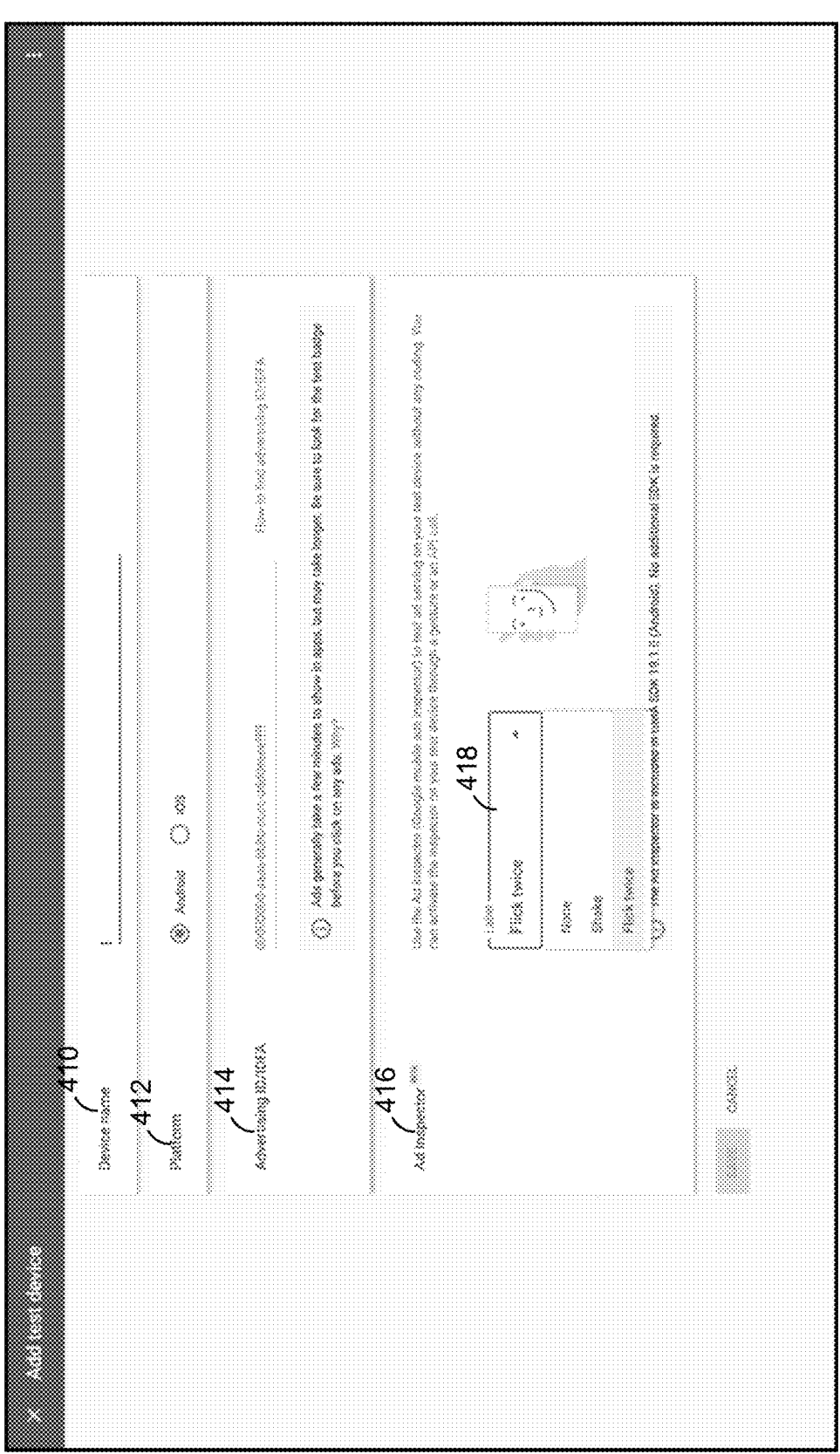
FIG. 4 is an example illustration depicting a registration interface, according to some embodiments.

Referring now to FIG. 4, an example illustration of a registration interface 400, according to some embodiments. As shown, includes a registration interface 400 enabling a user to register a user account of the user with the client device (e.g., client device 10). In various implementations, the user may have a user account with login credential and account data stored in a database (e.g., database 310). The account data can include information regarding the client devices registered with the debugger (e.g., library 20) of an application (e.g., application 12). That is, a user account may be registered with a plurality of client devices such that each client device can utilize the debugger on one or more applications stored on the client device. For example, Bob's user account may be registered with "mobile device 1" such that mobile device 1 can be utilized in debugging "application X." In another example, Jane's user account may be registered with "mobile device 2" such that mobile device 2 can be utilized in debugging "application Y."

Additionally, during the registration process the registration interface 400 can include various fields (e.g., 410, 412, 414, 416, 418). The input slots can include a device name field 410, a platform field 412, a content ID field 414, and a debugger field 416 and 418. Each field can receive input by the user via the client device. For example, a user may type (e.g., via a touchscreen keyboard) a device name and a content ID in their respective fields (e.g., 410 and 414). In this example, during registration, the user may also provide input for the platform field 412 and select a drop-down from the debugger field 418. Debugger field 418 can include the user input field for activating the library 20. As shown, the user input field can be a gesture or can be various other user input as described above with reference to FIG. 1.

In various implementations, each field may be various forms of input fields (e.g., text input, buttons, drop-downs, speech-to-text, etc.). Furthermore, various additional fields are contemplated in this disclosure. In some implementations, once the user provides input to various fields in registration interface 400, the client device 10 may send (e.g., over network 60) the input to first data processing system 300 for storage and/or analysis. In various implementations, the client device may become registered instantaneously after submitting the input or after analysis by the systems described herein. In some implementations, the user associated with a user account may be able to manage the client device registered with one or more applications. Management can include, but not limited to, removing client devices, changing configurations (e.g., names, gestures), etc.

Figure 5A:
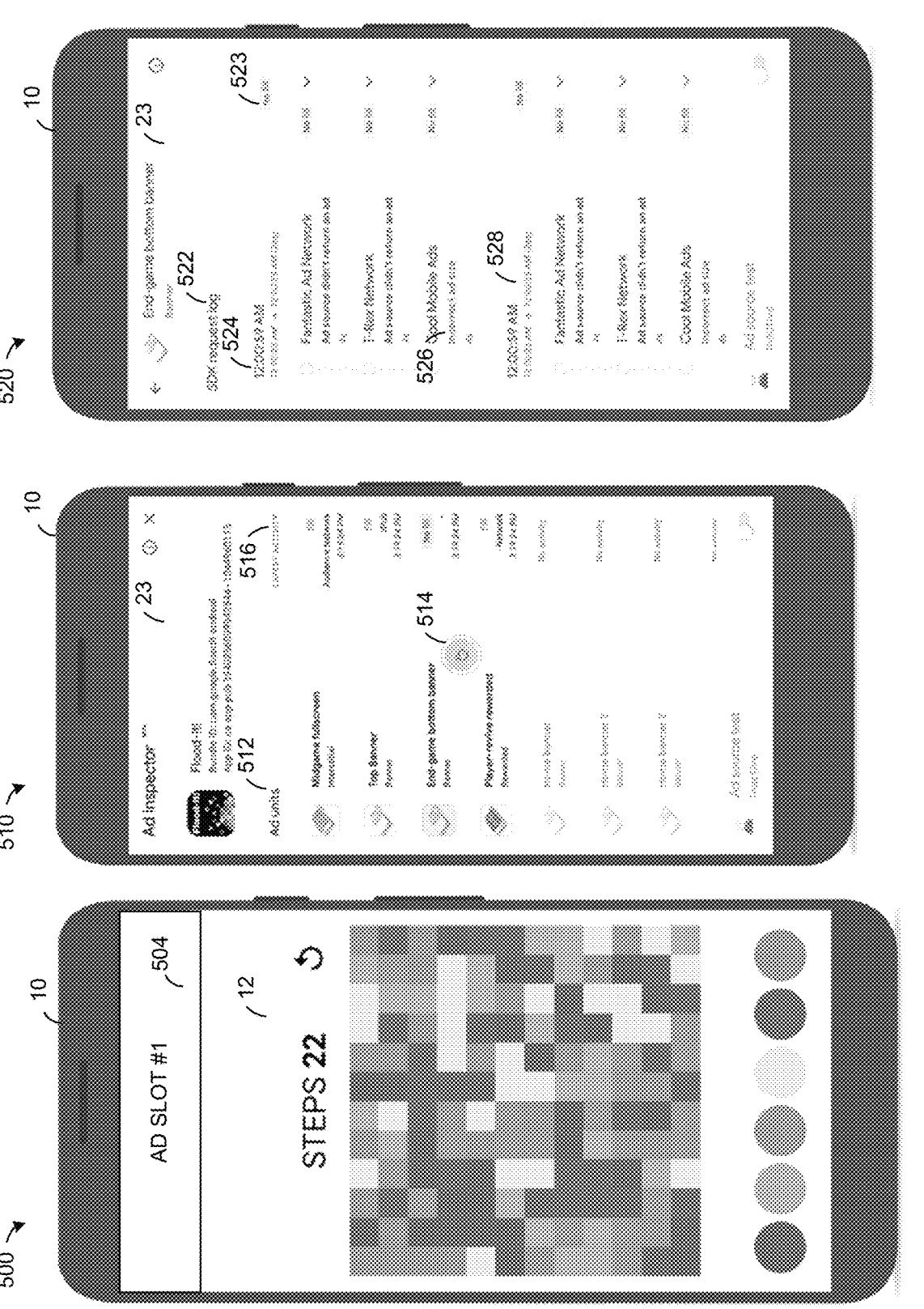
FIGS. 5A-5C are example illustrations depicting a debugging interface, according to some embodiments.
Figure 5B:
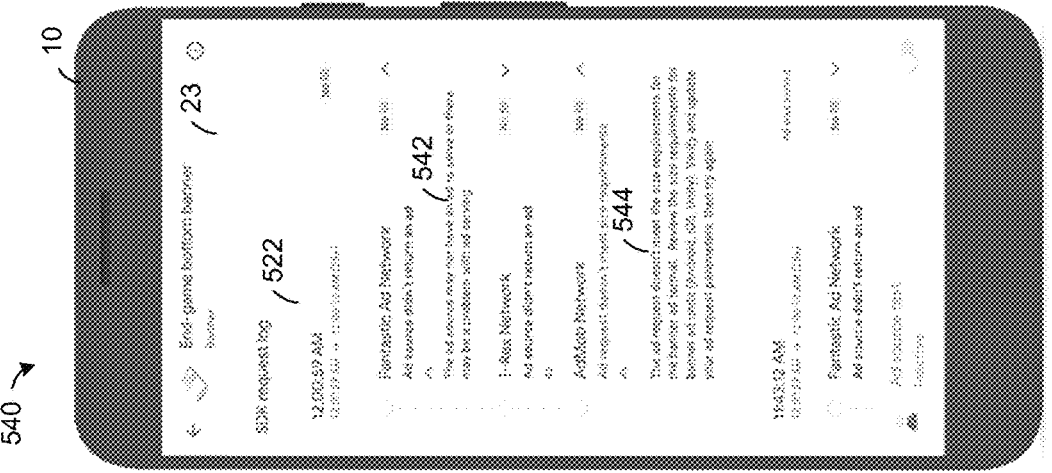
Figure 5B:
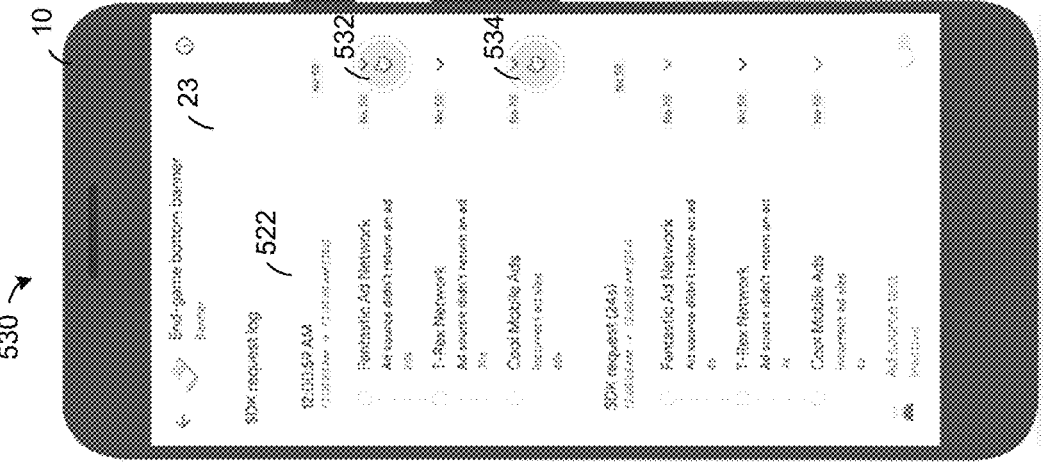
Figure 5C:
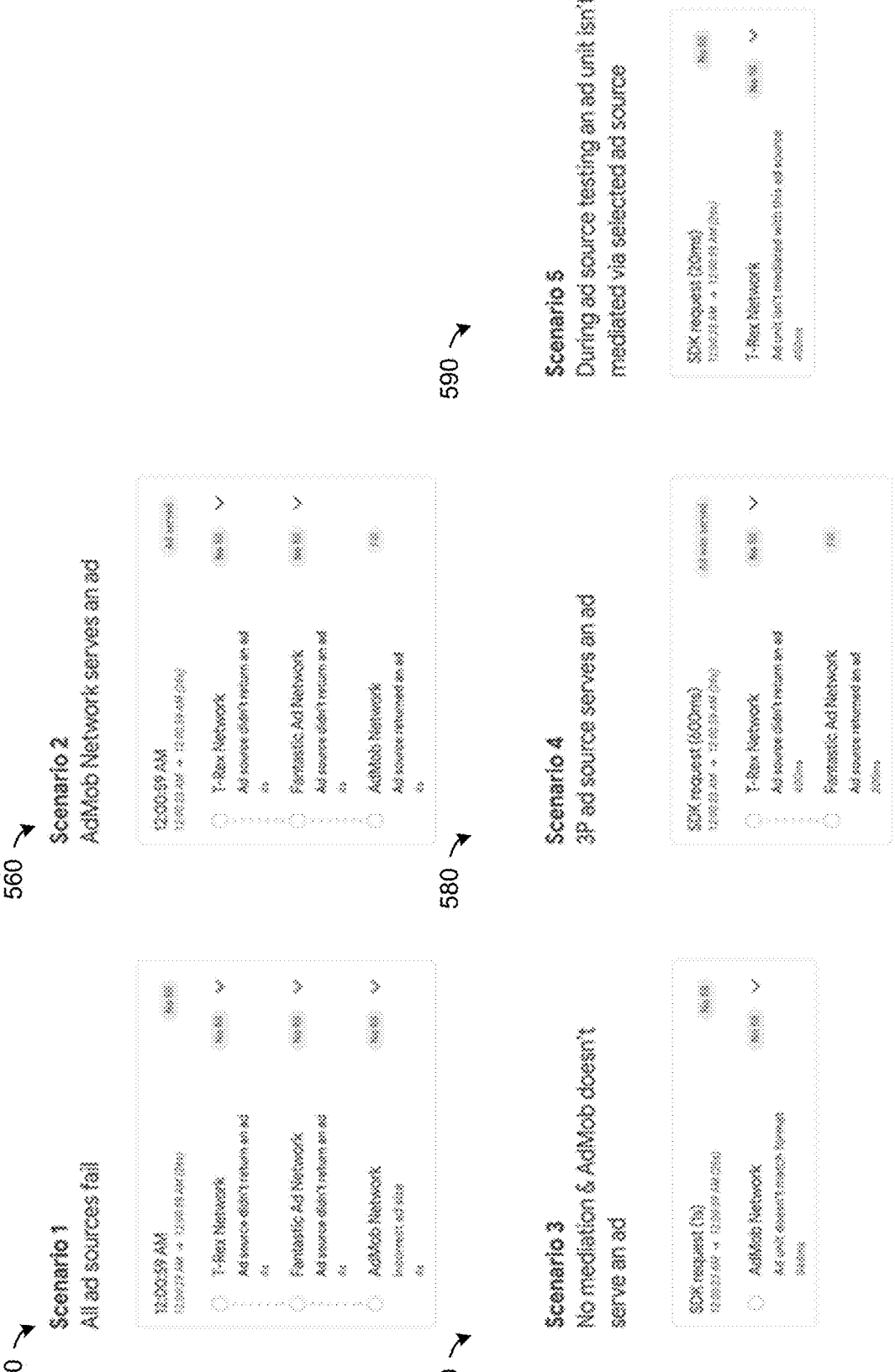

Referring now to FIGS. 5A-5C, example illustrations of a debugging interface 23, according to some embodiments. In general, FIGS. 5A-5C illustrate the debugging interface 23 that can be rendered at the client device 10 to debug and test content item slots and content items associated with content item event logs. The debugging interface 23 can include a plurality of interfaces and objects. For example, the client device 10 can execute to provide the debugging interface 23 with debugging information based on events executed in application 12.

In example illustration 500, the client device 10 is presenting application 12 in the viewport of client device 10 that can include one or more content item slots (e.g., content slot 504). Application 12 can be any type of application (e.g., in an application store, downloaded, custom, and so on) utilized by the user of client device 10. In various implementations, the client device 10 can be registered as a test device for application 12 (as described above). Upon a user action (e.g., gesture), example illustration 510 may be presented in the viewport of client device 10. For example, upon the client device 10 identifying a shake (e.g., via a sensor), the library 20 can be initialized and the debugging interface 23 may be presented within the viewport of the client device 10.

In example illustration 510, various debugging information may be presented, such as content item slot data including identifiers 512 and activity data 516. The identifiers 512 can include data specific to a specific content item slot of application 12. As shown, an identifier can be a midgame full screen content item slot, a top banner content item slot, an end-game bottom banner content item slot, a player-revive rewarded content item slot, a home banner content item slot, and a home banner 2 content item slot. Each identifier of identifiers 512 may include activity data 516. The activity data 516 can be indicative of activity associated with collected content event logs.

The content event logs can be collected by the event circuit 26 during execution of application 12 (e.g., during a session). The debugging circuit 22 may receive the content event logs, analyze the content event logs, and generate the debugging information. As shown, the activity data can include fill information indicating if a content item was served (e.g., provided, delivered, shown, presented) in the specific content item slot. The activity data can also include a timestamp of the most recent activity and the content network the content item was served. In some implementations, the inactive content item slots may be gray scaled or de-emphasized and the most recent activity data 516 of an identifier may be at the top of the viewport and descending down by next recent, and so on. For example, the midgame Fullscreen identifier may have the most recent event indicating the timestamp, the serve status (e.g., fill, no fill, delivered, no delivery, etc.) and the content network serving/served on. Upon a selecting 514 by the user of the client device 10 (e.g., via the touchscreen display), example illustration 520 may be presented in the viewport of client device 10. For example, upon the client device 10 receiving a selection, the library 20 can update the debugging interface 23 to present debugging information specific to the content item slot selected by selection 514.

In example illustration 520, various debugging information may be presented such as content item slot data including detailed event logs 522 including event log 524 and event log 528. Each event log can include additional data including serve status 523 and malfunctions 526 (sometimes referred to herein as "error summaries"). As shown, example illustration 520 present a detailed view of a specific content item slot. In some implementations, the detailed view can present a list of all of the attempted requests/events made to each content network for library 20. In various implementations, the events can be ordered based on activity (e.g., timestamps and by most recently finished) and each event can include a server status (e.g., fill, no fill, etc.). In various implementations, the event logs (e.g., 524 and 528) may be content item specific, such that each event log may be the activity of a particular content item in a particular content item slot.

The content event log (e.g., 524 and 528) can be titled by the time of the debugger completion time (e.g., 12:00:59). In addition, it will also include both the start time, end time and duration in seconds. (e.g., 12:00:23 AM, 12:00:59 AM (26 s)). In some implementations, the event log may show requests made after particular events (e.g., a successful fill event, the end of the waterfall). In particular, each particular event may also include, but is not limited to, a content network name, an outcome of the event (e.g., fill status), and its duration to execute (e.g., the round-trip time for each event). In some implementations, if an event is in progress, request may present only successfully completed events. Additionally, as shown, the debugging information of particular events can include malfunctions (e.g., 526). In one example, malfunction 526 could indicate a malfunction with a content item (e.g., incorrect content item size, return failure, exception, etc.). In another example, malfunction 526 could indicate a software crash or a hardware failure of the client device 10, application 12, library 20, and/or network 60. In some embodiments, the malfunction may be determined by the client device 10, content circuit 326, and/or analysis circuit 328. For example, the client device 10 may identify a software crash associated with application 12. In another example, the analysis circuit 328, after receiving bundles of event logs, may identify a large latency between certain events in the content event logs (e.g., 524 and 528). In yet another example, the content circuit 326, after receiving an interaction with a content item in a content item slot presented on the client device 10, may identify a content item slot serve error.

In example illustration 530 of FIG. 5B, the client device 10 may receive various selections 532 and 534, via the debugging interface 23, that can allow a user to further debug content event logs without development experience. As shown, once a user selects an event in the detailed event logs 522, example illustration 540 may be presented, via the viewport of the client device 10.

In example illustration 540, descriptions (e.g., 542 and 544) regarding detailed event logs 522 can be presented for analysis. As shown, the cause and action can be concatenated into descriptions 542 and 544 for their respective events. In various implementations, the descriptions may include selectable links for modifying content item configurations.

In example illustrations 550-590 of FIG. 5C, the debugging interface 23 depicts additional scenarios of presented debugging information, and in particular, content event logs. For example, in scenario 1 of example illustration 550 the library 20 executed and presented a waterfall of the content item slots that did not fill based on content networks (e.g., T-Rex Network, Fantastic Ad Network, AdMob Network). In this example, the T-Rex and Fantastic networks did not return a content item but there was no error (e.g., exception and/or malfunction), there was just no content item filled for the content item slot. Further and as shown, the AdMob network did not return a content item but did encounter an error, thus depicting an error why the content item did not fill.

In another example, in scenario 2 of example illustration 560 the library 20 executed and presented a waterfall of the content item slots that did fill based on content networks. In this example, the T-Rex and Fantastic networks did not return a content item but there was no error, there was just no content item filled for the content item slot. Further and as shown, the AdMob network did fill without error.

In another example, in scenario 3 of example illustration 570 the library 20 executed and presented a waterfall of the content item slots that did not fill based on content networks. In this example, the AdMob network did not fill and encountered an error (e.g., ad unit doesn't match format). In various implementations, the user may modify a content item configuration, via library 20, to remediate the error. For example, remediation can be performed by selecting the AdMob Network and modifying a specific content item configuration associated with the format of the content item.

In another example, in scenario 4 of example illustration 580 the library 20 executed and presented a waterfall of the content item slots that did fill based on content networks. In this example, the T-Rex network did not return a content item but there was no error, there was just no content item filled for the content item slot. Further and as shown, the AdMob network did fill without error.

In yet another example, in scenario 5 of example illustration 590 the library 20 executed and presented a waterfall of the content item slots that did fill based on content networks. In this example, the T-Rex network did not return a content item but there was no error, there was just no content item filled for the content item slot.

In some implementations, entities may bid on content item placement in content item slots. In such implementations, the example illustrations 550-590 may also include open bidding auction outcomes including, but not limited to, who won the auction, and present it in the order it ranked based on the price relative to the waterfall (e.g., or events in content event logs). In some implementations, entities may be associated with a priority, and an error message may include additional or fewer details based on the entity's priority.

Figure 6A:
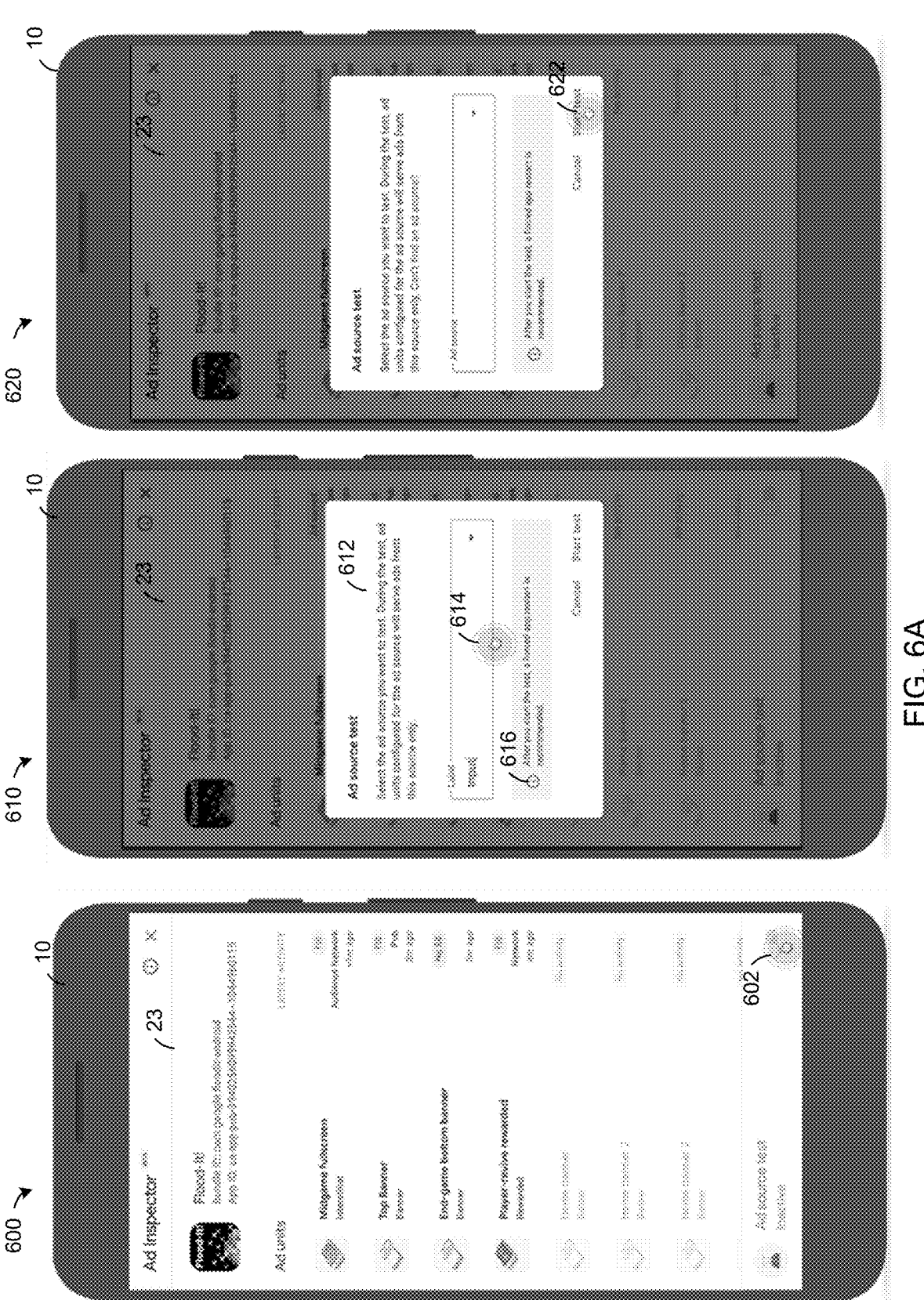
FIGS. 6A-6C are example illustrations depicting a debugging interface, according to some embodiments.
Figure 6B:
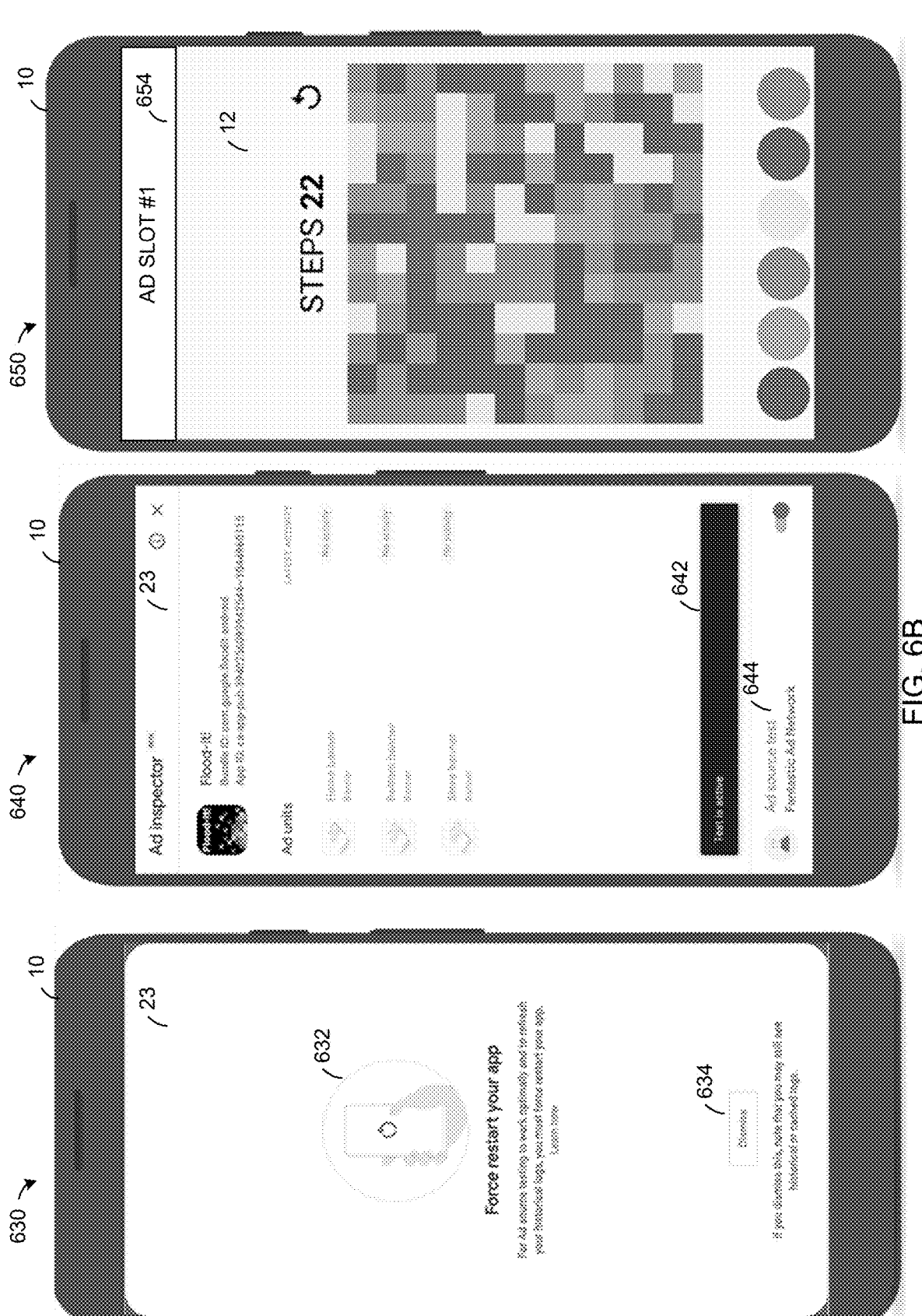
Figure 6C:
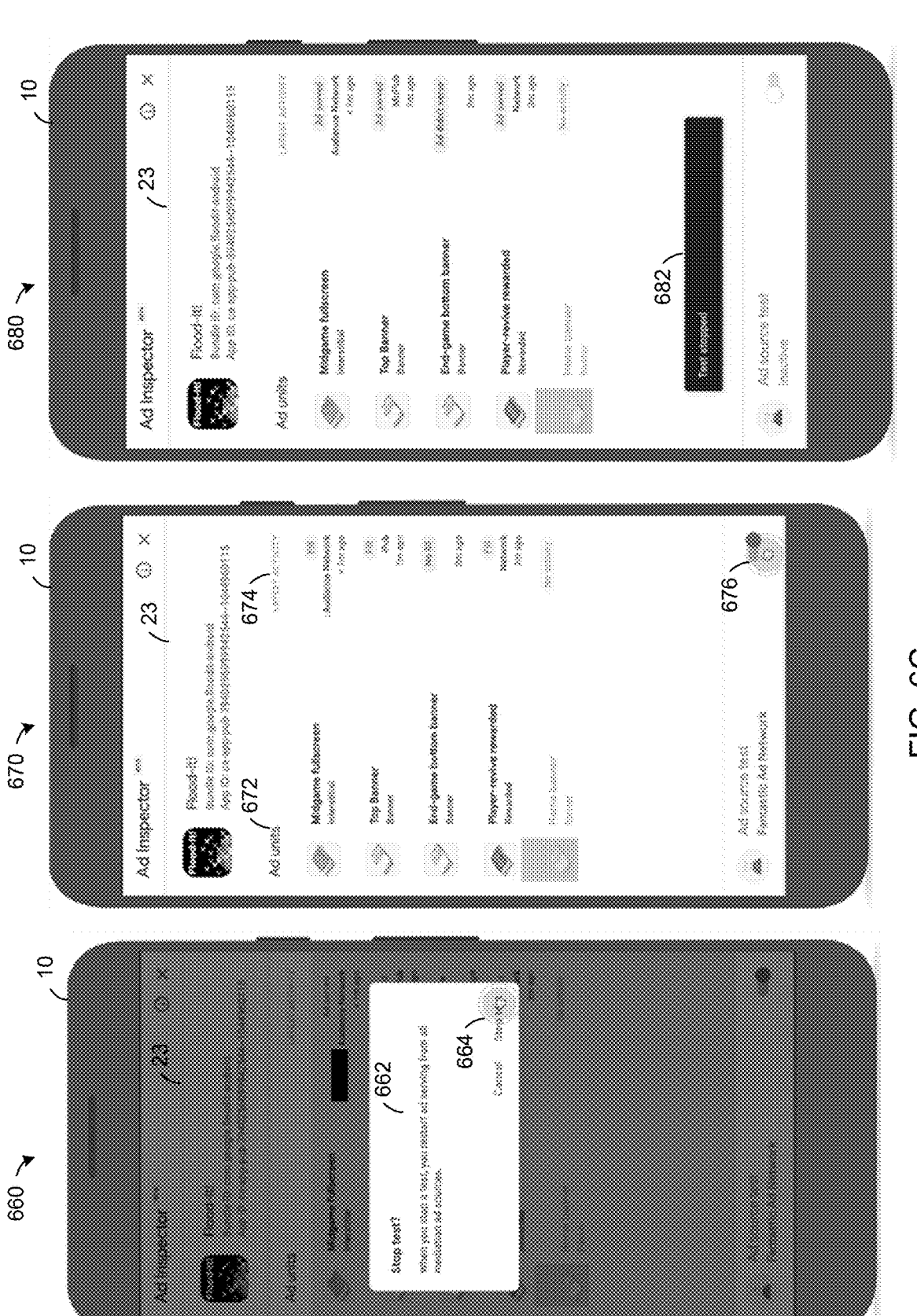

Referring now to FIGS. 6A-6C, example illustrations of a debugging interface 23, according to some embodiments. In general, FIGS. 6A-6C depict the ability for users (e.g., non-application developer) to select specific content networks to test mediation setups and server-side configurations. In general, mediation adapters are libraries (e.g., library 20) that enable the library to communicate with other libraries (e.g., stored on the client device 10, and/or over network 60). Thus, the other libraries may be packaged separately such that a content provide may select what mediation adapters they desire, and test different mediation setups (e.g., utilizing five mediation adapters, utilizing ten mediation adapters, and so on).

During these tests, the users can ensure, using debugging interface 23, that users are using the correct mediation adapters and that users have entered the correct content item identifiers, both of which can be solved by rendering (or presenting) a content item in application 12. Typically, latency can be an issue when performing content network test on individual content networks. However, as shown in FIGS. 6A-6C, users can force a specific content network tests via the debugging interface 23. In some implementations, the content network tests can be performed utilizing a virtual private network (VPN) in a particular geolocation (e.g., latitude and longitude). In one example, the content networks tests can be based on a specific geographic region (e.g., building, town, state, country) such that a VPN may be utilized to test in the specific geographic region.

In example illustration 600, a debugging interface 23 may include a test toggle 602, such that when toggled can activate and deactivate "test mode." In various implementations, test mode can include testing the functionality of various content items and content item slots on particular content networks. In some implementations, during testing, the client device 10 can collect content event logs. For example, upon the client device 10 receiving a selection, the library 20 can update the debugging interface 23 to present a content network test overlay 612.

In example illustration 610, a content network test overlay 612 is presented with various functionality including, a content network drop-down 614 and a selectable information icon 616. In some implementations, upon selection of the selectable information icon 616, the debugging interface 23 may overlay an additional page with information regarding content network testing.

In example illustration 620, the client device 10 receives a selection of the start test selectable icon 622. For example, upon the selection of a content network in the content network drop-down 614 and selecting the selectable icon 622, the library 20 can begin a content network test.

In example illustration 630, the debugging interface 22 may provide a notification 632 in the viewport of the client device 10 indicating application 12 (e.g., that is being debugged) should be restarted. In various implementations, a restart of application 12 may not be necessary. In some implementations, notification 632 may be dismissed by selectable icon 634.

In example illustration 640, the debugging interface 23 in the viewport of client device 10 may present a pop-up notification 642 indicating a content network test is active. Additionally, the debugging interface 23 in the viewport of the client device 10 may include a notification 644 of the content network being tested. In various implementation, the pop-up notification 642 may be persistent throughout the debugging interface 23 such that it is always being presented. In some implementations, when library 20 is in testing mode, all debugger requests will try to return content items for the select content network. For example, if "content network 1" was selected and a given content item slots but did not utilize content network 1, a no fill with an error message (sometimes referred to as an error summary or a malfunction) indicating a "content item slot is not configured for content network named content network 1."

In example illustration 650, the debugging interface 23 may become minimized or closed such that the user can interact with application 20 within the viewport of client device 10. For example, the user may select content item slot 654 and the library 20 may collect all events associated with the interaction. In various implementations, the debugging interface 23 may become minimized automatically after starting the content network test or after a user action (e.g., such as the gesture input during registration). In some implementations, the specific user action (e.g., different from the initialization action) may be set during registration for "toggling" between the debugging interface 23 during content network tests.

In example illustration 660, the debugging interface 23 may become overlayed on application 12 based on a user action (e.g., gesture) and/or based on the completion of a content network test. As shown, the debugging interface 23 may include another content network test overlay 662 that enables the user to select the stop test selectable icon 664.

In example illustration 670, the user may select the test toggle 676 (e.g., also 602) to exit test mode. In various implementations, upon exiting test mode the event circuit 26 may send content event logs associated with the content network test to debugging circuit 22 and/or first data processing system 300 for analysis.

In example illustration 680, the debugging interface 23 in the viewport of client device 10 may present a pop-up notification 682 indicating a content network test is deactivated (e.g., or stopped).

Figure 7A:
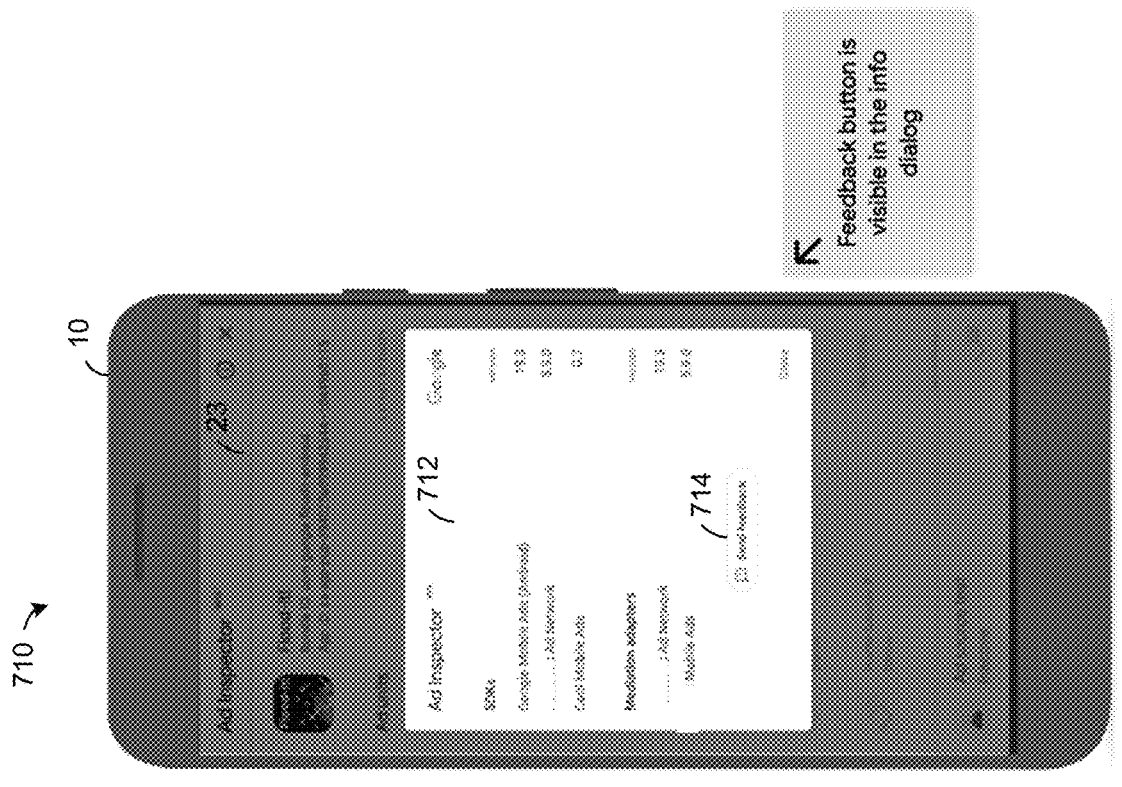
FIGS. 7A-7B are example illustrations depicting a debugging interface, according to some embodiments.
Figure 7A:
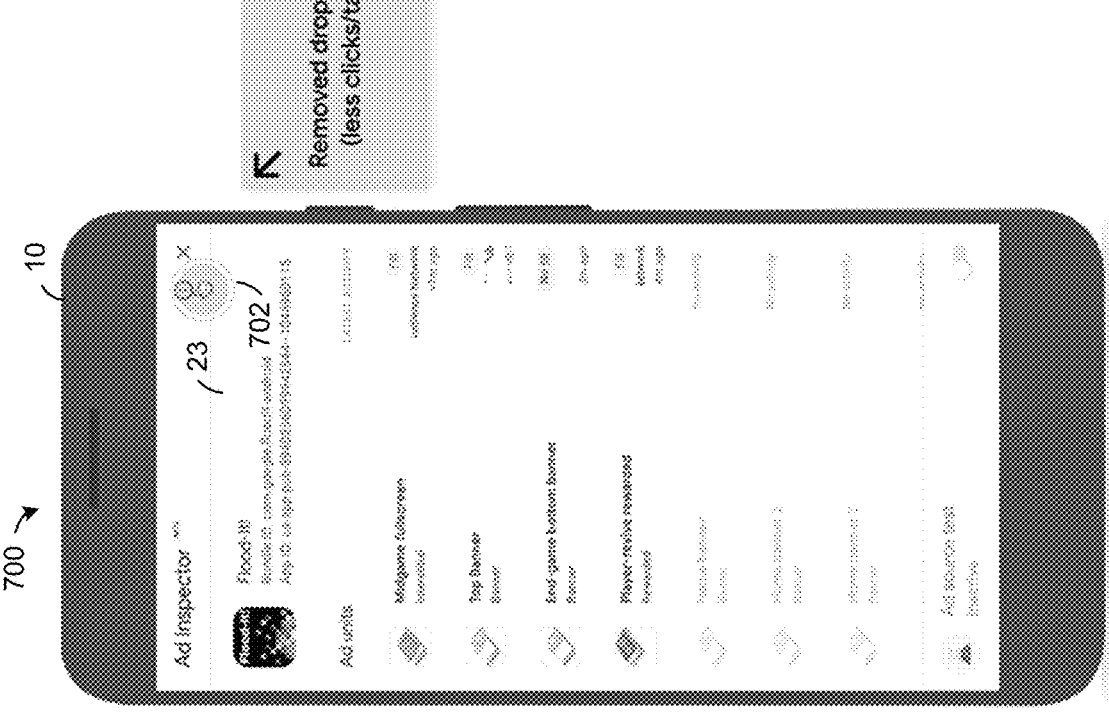
Figure 7B:
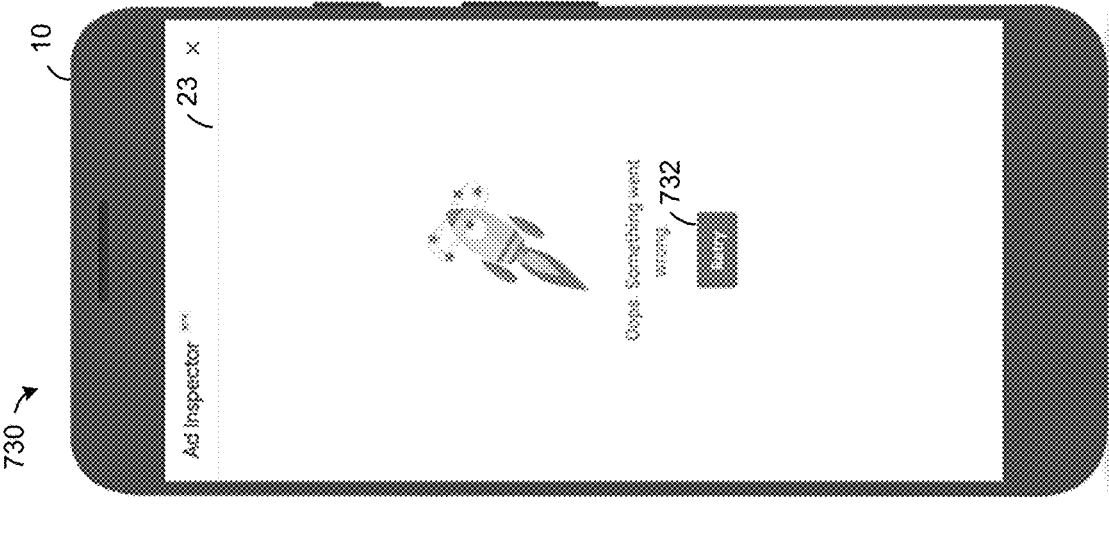
Figure 7B:
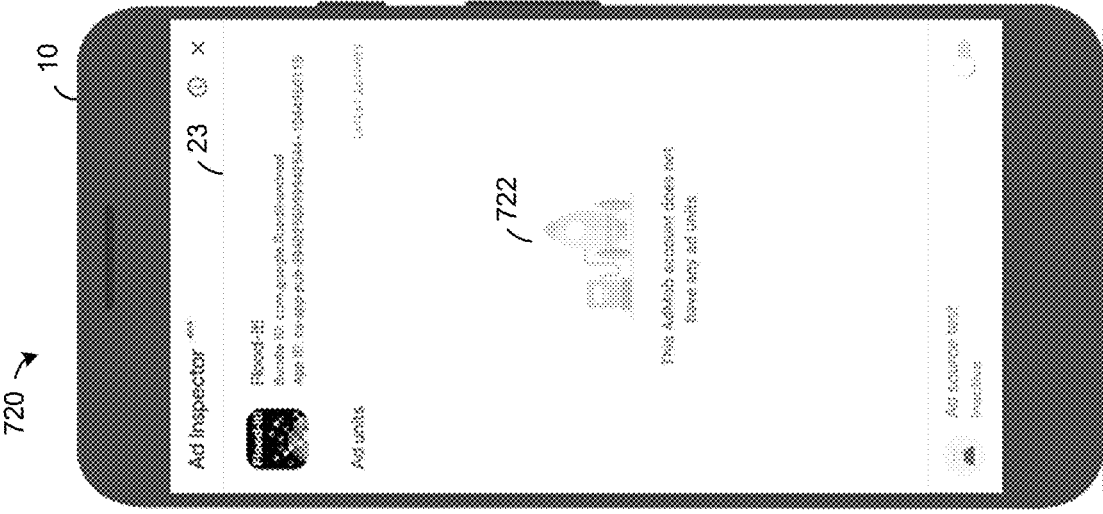

Referring now to FIGS. 7A-7B, example illustrations of a debugging interface, according to some embodiments. In general, FIG. 7A enables non-application developer to send feedback associated with the debugging interface 23 (e.g., example illustrations 700 and 710). The feedback can also include direct feedback by the user regarding improvements, changes, and additions to the debugging interface 23. In some implementations, sending feedback can also include content event log sharing such that when malfunctions/errors are discovered, the content event logs can be forwarded to a third-party system (e.g., first data processing system 300). For example, upon selection of 702, an overlay debugger configuration 712 may be presented that includes a send feedback selectable link 714. In some implementations, upon selection of the send feedback selectable link

714, the debugging circuit 22 may bundle debugging information and send (e.g., via email, Bluetooth, text, etc.) the content event log bundle to a third-party system (e.g., first data processing system 300 or another computer on network 60). In various implementations, the overlay debugger configuration 712 may also include versions of the library 20 (e.g., v19.3, v1.3) and/or versions of the content networks. In various implementations, the debugging interface 23 may also enable a non-application developer to clear all previously saved and collected content event logs.

In general FIG. 7B depicts an empty state of debugging interface 23 indicating no content items slots and/or content event log data has been collected by the library 20. In various implementations, if an account is unregistered with the client device 10, the empty state may be presented. In some implementations, the empty state may be presented if the library 20 had an error (or malfunction) initializing (or loading) the debugging interface 23.

FIG. 8 illustrates a depiction of a computer system 800 that can be used, for example, to implement an illustrative client device 10, an illustrative first data processing system 300, and/or various other illustrative systems described in the present disclosure. The computing system 800 includes a bus 805 or other communication component for communicating information and a processor 810 coupled to the bus 805 for processing information. The computing system 800 also includes main memory 815, such as a random-access memory (RAM) or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a read only memory (ROM) 820 or other static storage device coupled to the bus 805 for storing static information and instructions for the processor 810. A storage device 825, such as a solid-state device, magnetic disk or optical disk, is coupled to the bus 805 for persistently storing information and instructions.

The computing system 800 may be coupled via the bus 805 to a display 835, such as a liquid crystal display, or active matrix display, for displaying information to a user. An input device 830, such as a keyboard including alphanumeric and other keys, may be coupled to the bus 805 for communicating information, and command selections to the processor 810. In another implementation, the input device 830 has a touch screen display 835. The input device 830 can include a cursor control, such as a mouse, a trackball, or cursor direction keys, for communicating direction information and command selections to the processor 810 and for controlling cursor movement on the display 835.

In some implementations, the computing system 800 may include a communications adapter 840, such as a networking adapter. Communications adapter 840 may be coupled to bus 805 and may be configured to enable communications with a computing or communications network 130 and/or other computing systems. In various illustrative implementations, any type of networking configuration may be achieved using communications adapter 840, such as wired (e.g., via Ethernet), wireless (e.g., via Wifi, Bluetooth, etc.), pre-configured, ad-hoc, LAN, WAN, etc.

According to various implementations, the processes that effectuate illustrative implementations that are described herein can be achieved by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. In alternative implementations, hard-wired circuitry may be used in place of or in combination with software instructions to implement illustrative implementations. Thus, implementations are not limited to any specific combination of hardware circuitry and software.

Although an example processing system has been described in FIG. 8, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks, distributed ledger networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and/or other companion device(s). A smart television module may be configured to allow viewers to search and find videos, movies, photos and other content on the web, on a local cable TELEVISION channel, on a satellite TELEVISION channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, Disney+, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a smart watch, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method of debugging delivery of content items, the method comprising:

receiving, by one or more processing circuits, a registration request comprising an identifier and an activation gesture associated with a mobile application on a mobile device;

sending, by the one or more processing circuits to the mobile application on the mobile device, a notification indicating the mobile device is registered;

receiving, by the one or more processing circuits, a content item test request for content items in a specific content network;

testing, by the one or more processing circuits, the content items on the specific content network; and transmitting, by the one or more processing circuits to the mobile application on the mobile device, content event logs comprising debugging information of the content items during the testing on the content network.

2. The method of claim 1, comprising:

communicating, by the one or more processing circuits, with a debugging interface configured for presentation on the mobile device.

3. The method of claim 1, wherein the debugging information is configured for presentation in a debugging interface configured for presentation on the mobile device.

4. The method of claim 3, wherein the debugging interface configured for presentation as an overlay on first application interface.

5. The method of claim 3, wherein:

the content event logs are associated with content item slots in which content items are presented in the mobile application;

each of the content item slots comprises different debugging information;

the content event logs are organized in the debugging interface based on recency of the different debugging information for each of the content item slots; and inactive content items are organized together.

6. The method of claim 1, wherein the activation gesture is at least one of a shake, a flick, or a user-defined custom gesture configured within the mobile application.

7. The method of claim 1, wherein the content event logs comprise a number of events based on a threshold period of time or threshold number of events, and wherein each event of the number of events comprises usage data of the content items presented in the mobile application.

8. The method of claim 1, wherein the content event logs are associated with content item slots in which content items are presented in the mobile application.

9. The method of claim 1, comprising:

updating, by the one or more processing circuits, the content event logs in real-time based on obtaining additional debugging information associated with content items.

10. A computing system, comprising:

one or more processing circuits; and one or more memory devices that store, on one or more non-transitory computer-readable media, instructions that are executable by the one or more processing circuits to cause the computing system to perform operations, the operations comprising:

receiving a registration request comprising an identifier and an activation gesture associated with a mobile application on a mobile device;

sending, to the mobile application on the mobile device, a notification indicating the mobile device is registered;

receiving a content item test request for content items in a specific content network;

testing the content items on the specific content network; and transmitting, to the mobile application on the mobile device, content event logs comprising debugging information of the content items during the testing on the content network.

11. The computing system of claim 10, the operations comprising:

communicating with a debugging interface configured for presentation on the mobile device.

12. The computing system of claim 10, wherein the debugging information is configured for presentation in a debugging interface configured for presentation on the mobile device.

13. The computing system of claim 12, wherein the debugging interface configured for presentation as an overlay on first application interface.

14. The computing system of claim 12, wherein:

the content event logs are associated with content item slots in which content items are presented in the mobile application;

each of the content item slots comprises different debugging information;

the content event logs are organized in the debugging interface based on recency of the different debugging information for each of the content item slots; and inactive content items are organized together.

15. The computing system of claim 10, wherein the activation gesture is at least one of a shake, a flick, or a user-defined custom gesture configured within the mobile application.

16. The computing system of claim 10, wherein the content event logs comprise a number of events based on a threshold period of time or threshold number of events, and wherein each event of the number of events comprises usage data of the content items presented in the mobile application.

17. The computing system of claim 10, wherein the content event logs are associated with content item slots in which content items are presented in the mobile application.

18. The computing system of claim 10, the operations comprising:

updating the content event logs in real-time based on obtaining additional debugging information associated with content items.

19. One or more memory devices that store, on one or more non-transitory computer-readable media, instructions that are executable by one or more processing circuits to cause a computing system to perform operations, the operations comprising:

receiving a registration request comprising an identifier and an activation gesture associated with a mobile application on a mobile device;

sending, to the mobile application on the mobile device, a notification indicating the mobile device is registered;

receiving a content item test request for content items in a specific content network;

testing the content items on the specific content network; and transmitting, to the mobile application on the mobile device, content event logs comprising debugging information of the content items during the testing on the content network.

20. The one or more memory devices of claim 19, wherein the content event logs are associated with content item slots in which content items are presented in the mobile application.

* * * * *